United States Patent
MacManus et al.

(10) Patent No.: US 11,741,103 B1
(45) Date of Patent: Aug. 29, 2023

(54) DATABASE MANAGEMENT SYSTEMS USING QUERY-COMPLIANT HASHING TECHNIQUES

(71) Applicant: Optum Services (Ireland) Limited, Dublin (IE)

(72) Inventors: Lorcan B. MacManus, Maynooth (IE); Peter Cogan, Dublin (IE); Lu Zheng, Flushing, NY (US)

(73) Assignee: Optum Services (Ireland) Limited, Dublin (IE)

( * ) Notice: Subject to any disclaimer, the term of this patent is extended or adjusted under 35 U.S.C. 154(b) by 0 days.

(21) Appl. No.: 17/654,694

(22) Filed: Mar. 14, 2022

(51) Int. Cl.
*G06F 16/2455* (2019.01)
*G06F 16/21* (2019.01)
*G06F 16/242* (2019.01)

(52) U.S. Cl.
CPC .......... *G06F 16/2456* (2019.01); *G06F 16/21* (2019.01); *G06F 16/2425* (2019.01)

(58) Field of Classification Search
CPC ... G06F 16/2456; G06F 16/21; G06F 16/2425
See application file for complete search history.

(56) References Cited

U.S. PATENT DOCUMENTS

| | | | |
|---|---|---|---|
| 5,835,897 A | 11/1998 | Dang | |
| 7,685,006 B2 | 3/2010 | Rahn et al. | |
| 7,739,132 B2 | 6/2010 | Denny, Jr. et al. | |
| 7,953,615 B2 | 5/2011 | Aquila et al. | |
| 9,779,129 B1 | 10/2017 | Lequeux | |
| 9,779,407 B2 | 10/2017 | Adjaoute | |
| 10,832,819 B2 | 11/2020 | Simon et al. | |
| 2009/0070321 A1* | 3/2009 | Apartsin | G06F 16/9032 707/999.005 |
| 2014/0200928 A1 | 7/2014 | Watanabe et al. | |
| 2015/0088557 A1 | 3/2015 | Huynh et al. | |
| 2017/0017760 A1 | 1/2017 | Freese et al. | |
| 2019/0188322 A1* | 6/2019 | Krishna | G06N 20/00 |
| 2021/0201266 A1 | 7/2021 | Wang et al. | |
| 2022/0138185 A1* | 5/2022 | Tran | G06F 40/56 706/18 |

OTHER PUBLICATIONS

Bjelland, Petter Christian et al. "Practical Use of Approximate Hash-Based Matching in Digital Investigations," Digital Investigation, vol. 11, Supplement 1, May 2014, pp. S18-S26, DOI: 10.1016/j.diin.2014.03.003.

(Continued)

*Primary Examiner* — Cam Y T Truong
(74) *Attorney, Agent, or Firm* — ALSTON & BIRD LLP

(57) ABSTRACT

Various embodiments of the present invention provide methods, apparatuses, systems, computing devices, computing entities, and/or the like for facilitating efficient and effective execution of database management operations. For example, various embodiments of the present invention provide methods, apparatuses, systems, computing devices, computing entities, and/or the like for facilitating efficient and effective execution of database management operations using at least one of query-compliant hash databases, segmentation-based hashing models, and hash segmentation models.

20 Claims, 17 Drawing Sheets

(56) References Cited

OTHER PUBLICATIONS

Brumm, Ben. "Database Keys: The Complete Guide (Surrogate, Natural, Composite & More)," Database Star, (11 pages), (online), [Retrieved from the Internet May 23, 2022] <URL: https://www.databasestar.com/database-keys/>.

Wikipedia Contributors. "Birthday Attack," Wikipedia, The Free Encyclopedia, Jan. 29, 2022, (3 pages), (online), [Retrieved from the Internet May 23, 2022] <URL: https://en.wikipedia.org/w/index.php?title=Birthday_attack&oldid=1068584536>.

Corrected Notice of Allowance and Fee(s) Due, for U.S. Appl. No. 17/654,691, dated Mar. 27, 2023, (20 pages), United States Patent and Trademark Office, US.

Notice of Allowance and Fee(s) Due for U.S. Appl. No. 17/654,691, dated Mar. 23, 2023, (23 pages), United States Patent and Trademark Office, US.

\* cited by examiner

```
SELECT * FROM Members
WHERE    (member_name = 'John Smith' AND member_ID = 12345)
AND      (hospital_ID != 3543 OR provider_ID != 222)
AND      (state_name != 'Georgia' OR city_name != 'Rome')
AND      (admission_date != 2022-01-29)
```

FIG. 5

```
select distinct
    A.index as current_index,
    B.index as history_index
from tokens_current A
inner join tokens_history B on
    A.t1 = B.t1 and
    A.t2 != B.t2 and
    A.t3 != B.t4 and
    A.t4 != B.t4 and
    A.index > B.index
```

FIG. 11

```
select distinct
    A.index as current_index,
    B.index as history_index
from tokens_current A
inner join tokens_history B on
    A.t1 = B.t1 and
    A.W != B.W and
    A.X != B.X and
    A.t4 != B.t4 and
    A.index > B.index
```

FIG. 12

Here are providers that match your query:

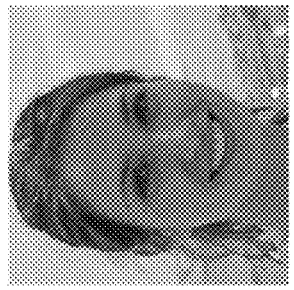

Allen Ann, MD
Obstetrics and Gynecology, Infertility
13135 ABC Rd NE Bldg A4th
Atlanta, GA 30322

Schedule An Appointment

◆ Quality Care Physician
● Accepting All Patients
● In-Network Provider
★★★★★ (22)

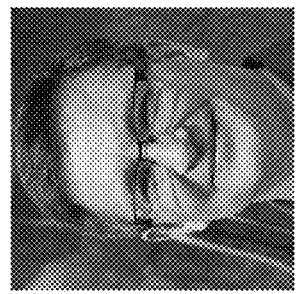

Bialish, Mark, MD
Reproductive Endocrinology, Infertility,
5445 DEF Mark Rd Ste 270
Atlanta, GA 30342

Schedule An Appointment

◇ Not Evaluated For Premium Care
● Accepting All Patients
● In-Network Provider
★★★★★ (87)

FIG. 13

DATABASE MANAGEMENT SYSTEMS USING QUERY-COMPLIANT HASHING TECHNIQUES

BACKGROUND

Various embodiments of the present invention address technical challenges related to performing efficient and effective execution of database management operations.

BRIEF SUMMARY

In general, various embodiments of the present invention provide methods, apparatuses, systems, computing devices, computing entities, and/or the like for facilitating efficient and effective execution of database management operations. For example, various embodiments of the present invention provide methods, apparatuses, systems, computing devices, computing entities, and/or the like for facilitating efficient and effective execution of database management operations using at least one of query-compliant hash databases, segmentation-based hashing models, and segmentation models.

In accordance with one aspect, a method includes: identifying a segmentation-based hashing model, wherein the segmentation-based hashing model is configured to: for each match field value of a plurality of match field values of a hashing input data object that are subject to a match requirement, generate a match field value hash representation, combine each match field value hash representation using a segmentation model associated with the segmentation-based hashing model to generate a match requirement hash representation for the match requirement, for each disjunctive non-match field value of a plurality of disjunctive non-match field values of the hashing input data object that are subject to a disjunctive non-match requirement, generate a disjunctive non-match field value hash representation, determine a disjunctive non-match requirement hash representation for the disjunctive non-match requirement based at least in part on each disjunctive non-match field value hash representation, and generate an output hash representation combination for the hashing input data object based at least in part on the match requirement hash representation and the disjunctive non-match requirement hash representation; generating, using the segmentation-based hashing model and based at least in part on a plurality of query field values of a database query, a query hash representation combination for the segmentation-based hashing model, wherein the query hash representation combination is the output hash representation combination generated by the segmentation-based hashing model via processing the database query as the hashing input data object; generating, based at least in part on the query hash representation combination, a refined database query corresponding for the database query; performing one or more query retrieval operations corresponding to the refined database query and in relation to a query-compliant hash database in order to generate one or more refined query results; and performing one or more database management operations based at least in part on the one or more refined query results.

In accordance with another aspect, an apparatus comprising at least one processor and at least one memory including program code, the at least one memory and the program code configured to, with the processor, cause the apparatus to at least: identify a segmentation-based hashing model, wherein the segmentation-based hashing model is configured to: for each match field value of a plurality of match field values of a hashing input data object that are subject to a match requirement, generate a match field value hash representation, combine each match field value hash representation using a segmentation model associated with the segmentation-based hashing model to generate a match requirement hash representation for the match requirement, for each disjunctive non-match field value of a plurality of disjunctive non-match field values of the hashing input data object that are subject to a disjunctive non-match requirement, generate a disjunctive non-match field value hash representation, determine a disjunctive non-match requirement hash representation for the disjunctive non-match requirement based at least in part on each disjunctive non-match field value hash representation, and generate an output hash representation combination for the hashing input data object based at least in part on the match requirement hash representation and the disjunctive non-match requirement hash representation; generate, using the segmentation-based hashing model and based at least in part on a plurality of query field values of a database query, a query hash representation combination for the segmentation-based hashing model, wherein the query hash representation combination is the output hash representation combination generated by the segmentation-based hashing model via processing the database query as the hashing input data object; generate, based at least in part on the query hash representation combination, a refined database query corresponding for the database query; perform one or more query retrieval operations corresponding to the refined database query and in relation to a query-compliant hash database in order to generate one or more refined query results; and perform one or more database management operations based at least in part on the one or more refined query results.

In accordance with yet another aspect, a computer program product comprising at least one non-transitory computer-readable storage medium having computer-readable program code portions stored therein, the computer-readable program code portions configured to: identify a segmentation-based hashing model, wherein the segmentation-based hashing model is configured to: for each match field value of a plurality of match field values of a hashing input data object that are subject to a match requirement, generate a match field value hash representation, combine each match field value hash representation using a segmentation model associated with the segmentation-based hashing model to generate a match requirement hash representation for the match requirement, for each disjunctive non-match field value of a plurality of disjunctive non-match field values of the hashing input data object that are subject to a disjunctive non-match requirement, generate a disjunctive non-match field value hash representation, determine a disjunctive non-match requirement hash representation for the disjunctive non-match requirement based at least in part on each disjunctive non-match field value hash representation, and generate an output hash representation combination for the hashing input data object based at least in part on the match requirement hash representation and the disjunctive non-match requirement hash representation; generate, using the segmentation-based hashing model and based at least in part on a plurality of query field values of a database query, a query hash representation combination for the segmentation-based hashing model, wherein the query hash representation combination is the output hash representation combination generated by the segmentation-based hashing model via processing the database query as the hashing input data object; generate, based at least in part on the query hash representation combination, a refined database query corresponding for the database query; perform one or more query retrieval operations corresponding to the refined database query and in relation to a query-compliant hash database in order to generate one or more refined query results; and perform one or more database management operations based at least in part on the one or more refined query results.

In accordance with one aspect, a method includes: identifying a segmentation-based hashing model, wherein the segmentation-based hashing model is configured to: (i) for each match field value of a plurality of match field values of a hashing input data object that are subject to a match requirement, generate a match field value hash representation, (ii) perform, via N segmentation iterations, a sequence of M hash merger operations on each match field value hash representation for the hashing input data object to generate a match requirement hash representation for the hashing input data object, wherein: (a) during an initial segmentation iteration, the segmentation model performs K initial hash merger operations to generate a merged hash representation set comprising K initial merged hash representations, each initial merged hash representation being generated by combining match field value hash representations for a corresponding subset of data field value values associated with the plurality of match field values, (b) during each non-initial segmentation iteration, the segmentation model performs a corresponding non-initial hash merger operation to update the merged hash representation set by replacing a defined subset of the merged hash representation set with a resulting merged hash representation, and (c) during a final segmentation iteration, the segmentation model performs a corresponding hash merger operation to update the merged hash representation set by replacing all of the merged hash representation set with the match requirement hash representation, and (iii) generate an output hash representation combination for the hashing input data object based at least in part on the match requirement hash representation; generating, using the segmentation-based hashing model and based at least in part on a plurality of query field values of a database query, a query hash representation combination for the segmentation-based hashing model, wherein the query hash representation combination is the output hash representation combination generated by the segmentation-based hashing model via processing the database query as the hashing input data object; generating, based at least in part on the query hash representation combination, a refined database query corresponding for the database query; performing one or more query retrieval operations corresponding to the refined database query and in relation to the query-compliant hash database in order to generate one or more refined query results; and performing the one or more database management operations based at least in part on the one or more refined query results.

In accordance with another aspect, an apparatus comprising at least one processor and at least one memory including program code, the at least one memory and the program code configured to, with the processor, cause the apparatus to at least: identify a segmentation-based hashing model, wherein the segmentation-based hashing model is configured to: (i) for each match field value of a plurality of match field values of a hashing input data object that are subject to a match requirement, generate a match field value hash representation, (ii) perform, via N segmentation iterations, a sequence of M hash merger operations on each match field value hash representation for the hashing input data object to generate a match requirement hash representation for the hashing input data object, wherein: (a) during an initial segmentation iteration, the segmentation model performs K initial hash merger operations to generate a merged hash representation set comprising K initial merged hash representations, each initial merged hash representation being generated by combining match field value hash representations for a corresponding subset of data field value values associated with the plurality of match field values, (b) during each non-initial segmentation iteration, the segmentation model performs a corresponding non-initial hash merger operation to update the merged hash representation set by replacing a defined subset of the merged hash representation set with a resulting merged hash representation, and (c) during a final segmentation iteration, the segmentation model performs a corresponding hash merger operation to update the merged hash representation set by replacing all of the merged hash representation set with the match requirement hash representation, and (iii) generate an output hash representation combination for the hashing input data object based at least in part on the match requirement hash representation; generate, using the segmentation-based hashing model and based at least in part on a plurality of query field values of a database query, a query hash representation combination for the segmentation-based hashing model, wherein the query hash representation combination is the output hash representation combination generated by the segmentation-based hashing model via processing the database query as the hashing input data object; generate, based at least in part on the query hash representation combination, a refined database query corresponding for the database query; perform one or more query retrieval operations corresponding to the refined database query and in relation to the query-compliant hash database in order to generate one or more refined query results; and perform the one or more database management operations based at least in part on the one or more refined query results.

In accordance with yet another aspect, a computer program product comprising at least one non-transitory computer-readable storage medium having computer-readable program code portions stored therein, the computer-readable program code portions configured to: identify a segmentation-based hashing model, wherein the segmentation-based hashing model is configured to: (i) for each match field value of a plurality of match field values of a hashing input data object that are subject to a match requirement, generate a match field value hash representation, (ii) perform, via N segmentation iterations, a sequence of M hash merger operations on each match field value hash representation for the hashing input data object to generate a match requirement hash representation for the hashing input data object, wherein: (a) during an initial segmentation iteration, the segmentation model performs K initial hash merger operations to generate a merged hash representation set comprising K initial merged hash representations, each initial merged hash representation being generated by combining match field value hash representations for a corresponding subset of data field value values associated with the plurality of match field values, (b) during each non-initial segmentation iteration, the segmentation model performs a corresponding non-initial hash merger operation to update the merged hash representation set by replacing a defined subset of the merged hash representation set with a resulting merged hash representation, and (c) during a final segmentation iteration, the segmentation model performs a corresponding hash merger operation to update the merged hash representation set by replacing all of the merged hash representation set with the match requirement hash representation, and (iii) generate an output hash representation combination for the hashing input data object based at least in part on the match requirement hash representation; generate, using the segmentation-based hashing model and based at least in part on a plurality of query field values of a database query, a query hash representation combination for the segmentation-based hashing model, wherein the query hash representation combination is the output hash representation combination generated by the segmentation-based hashing model via processing the database query as the hashing input data object; generate, based at least in part on the query hash representation combination, a refined database query corresponding for the database query; perform one or more query retrieval operations corresponding to the refined database query and in relation to the query-compliant hash database in order to generate one or more refined query results; and perform the one or more database management operations based at least in part on the one or more refined query results.

BRIEF DESCRIPTION OF THE DRAWINGS

Figure 1:
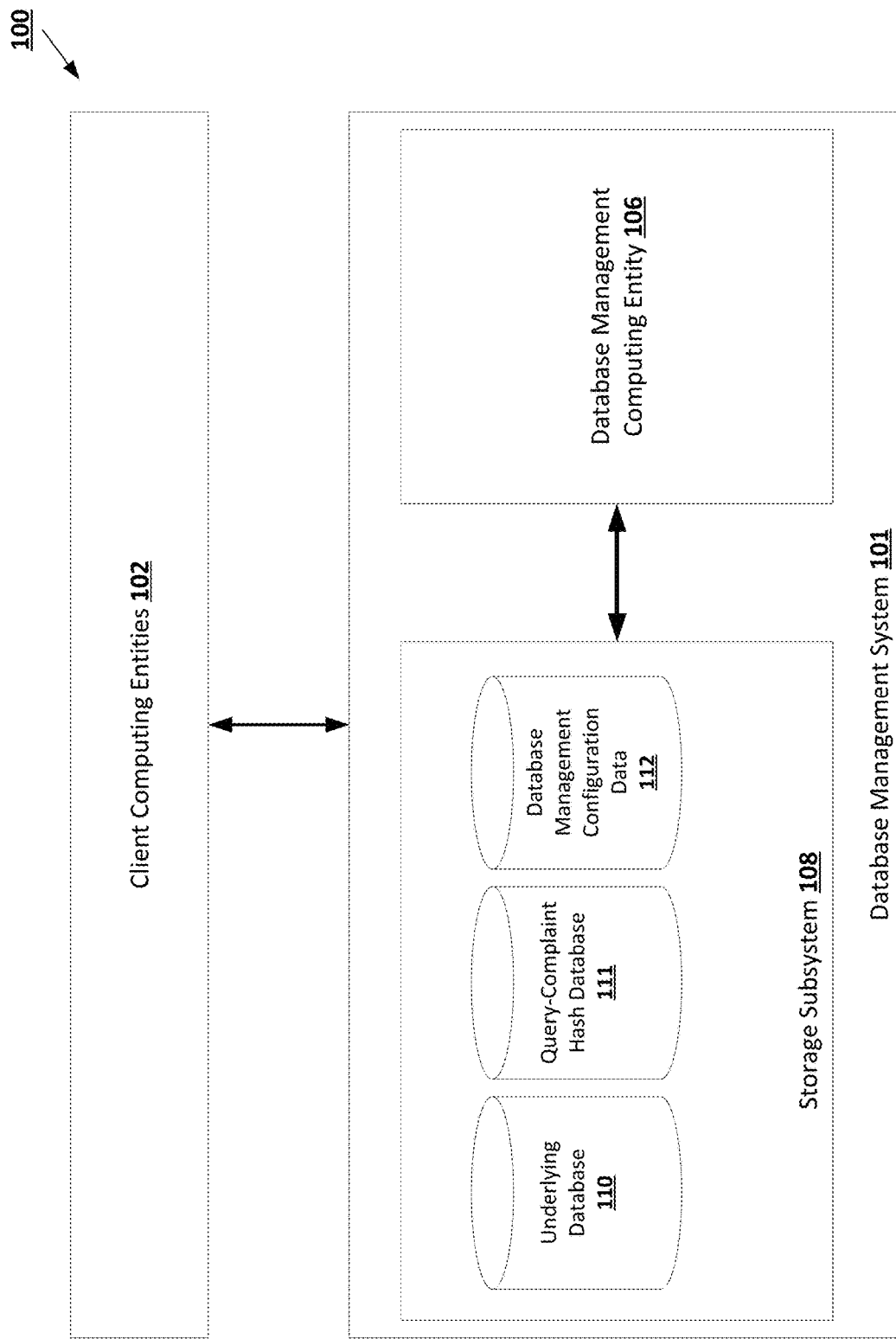

Having thus described the invention in general terms, reference will now be made to the accompanying drawings, which are not necessarily drawn to scale, and wherein:

FIG. 1 provides an exemplary overview of a system that can be used to practice embodiments of the present invention.

Figure 2:
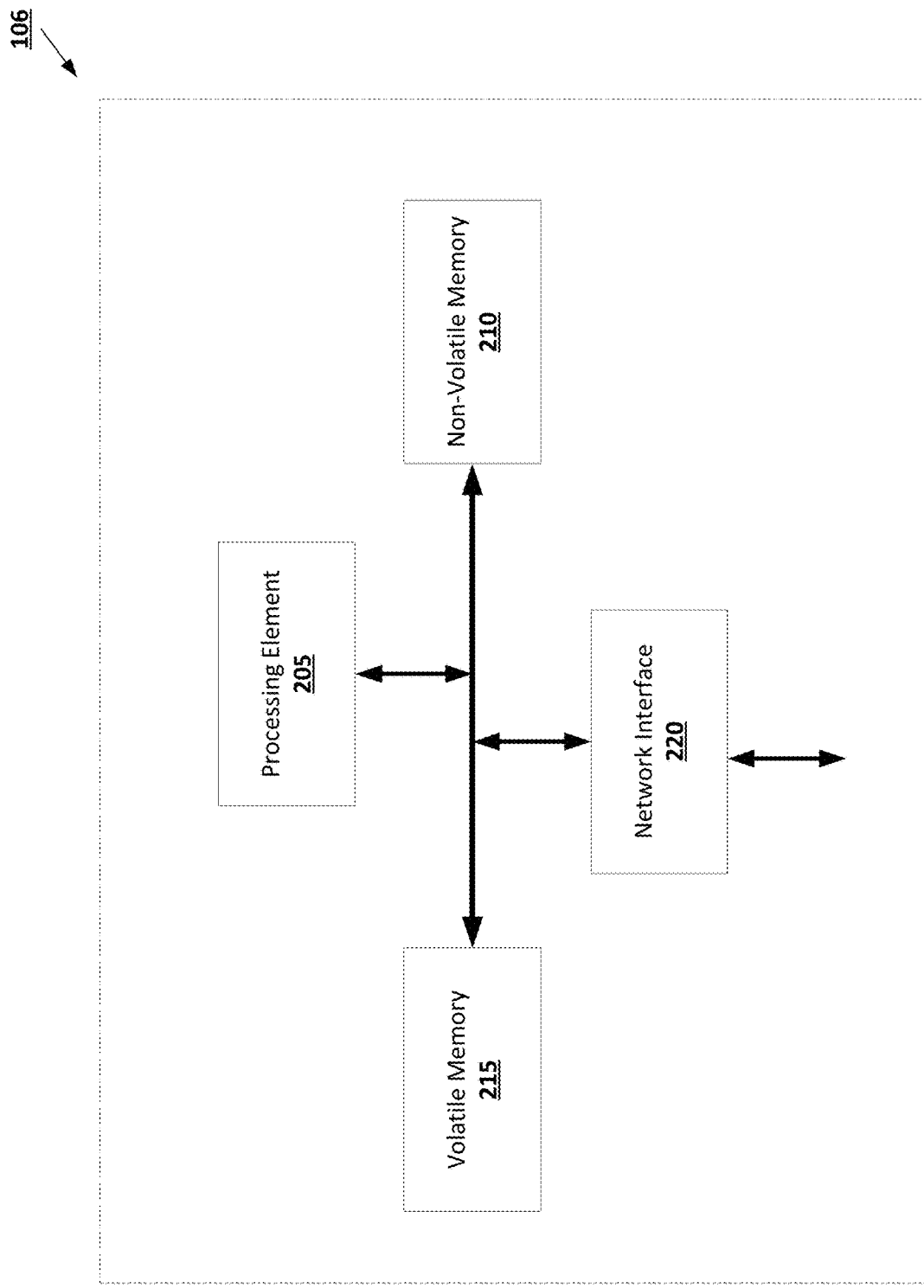

FIG. 2 provides an example database management computing entity in accordance with some embodiments discussed herein.

Figure 3:
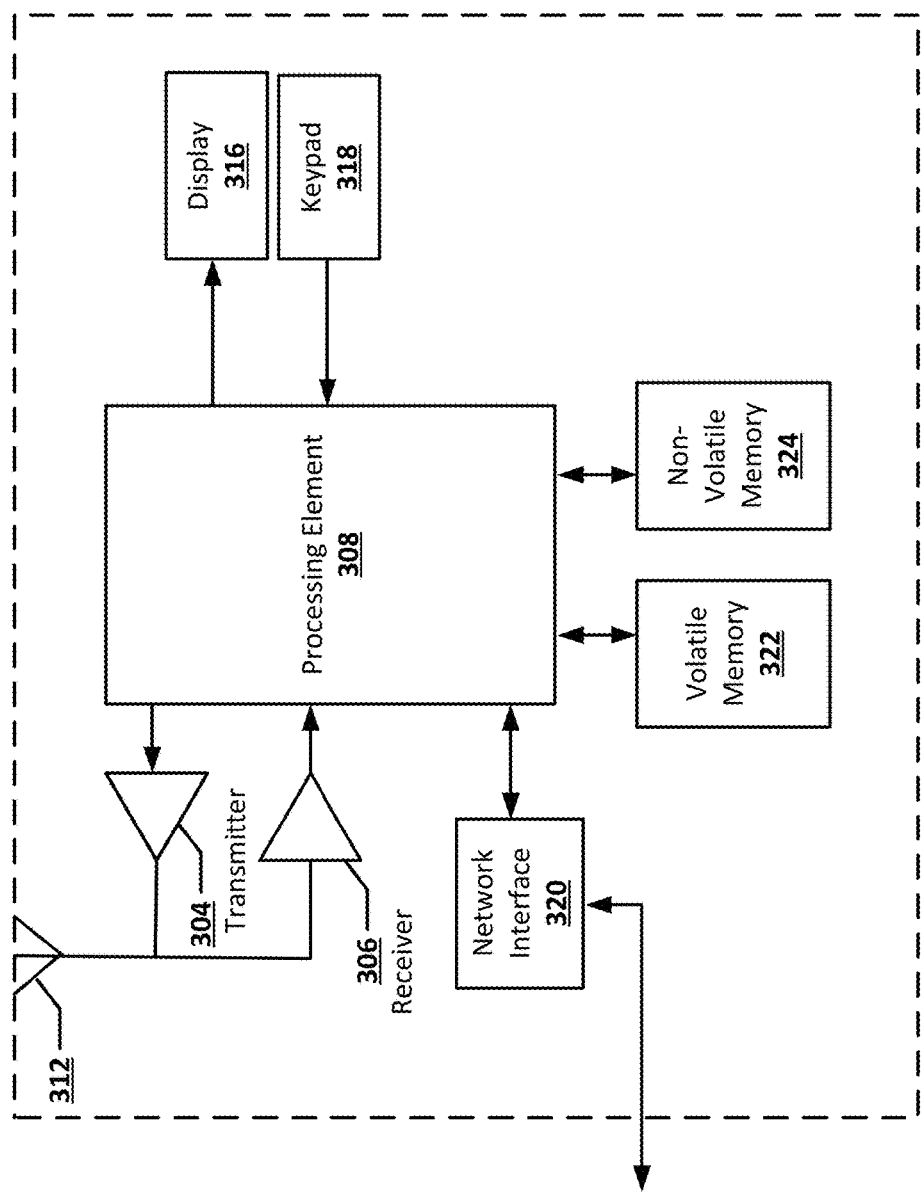

FIG. 3 provides an example client computing entity in accordance with some embodiments discussed herein.

Figure 4:
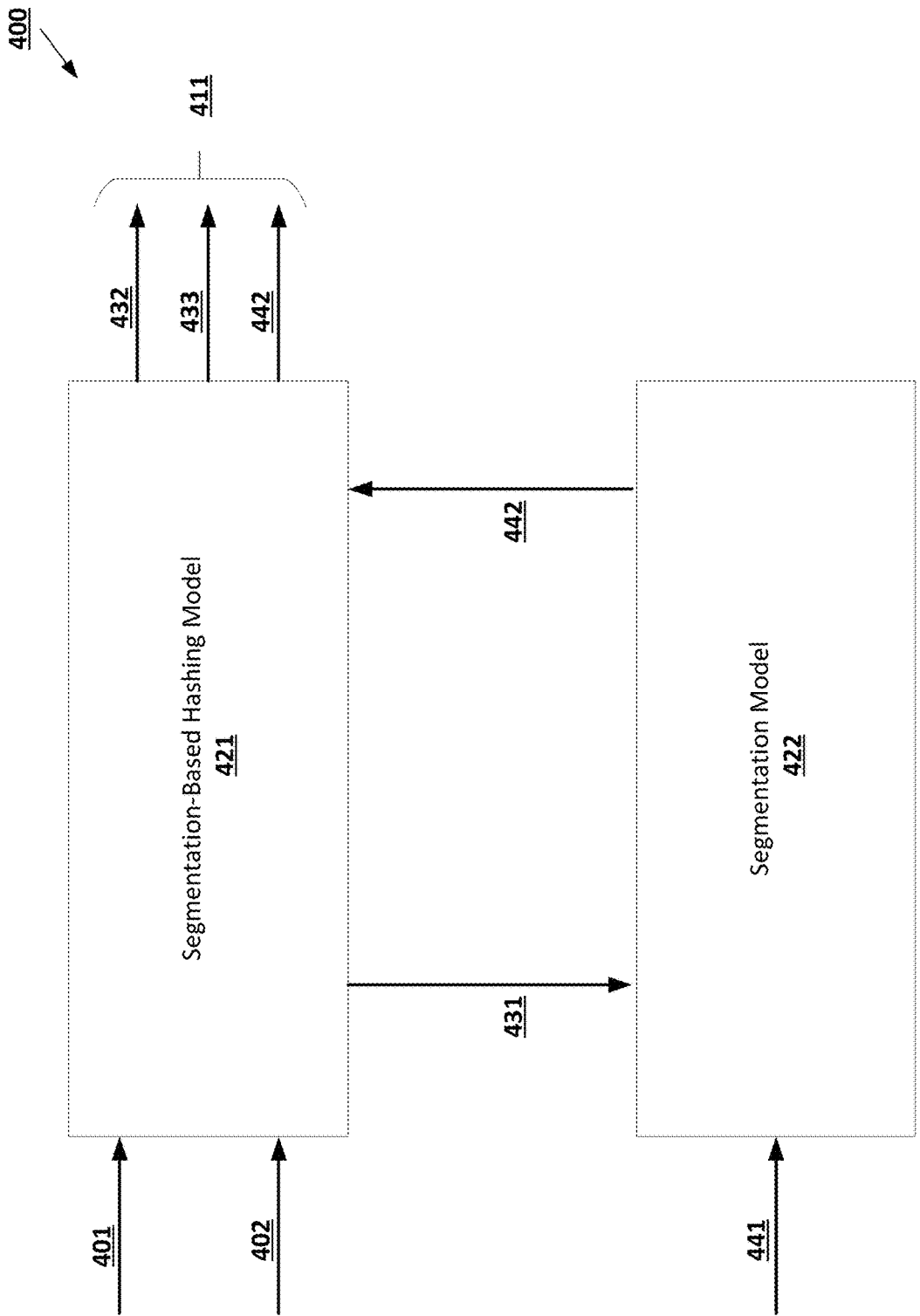

FIG. 4 is a data flow diagram of an example process for generating an output hash representation combination for a hashing input data object associated with a query-compliant hash database in accordance with some embodiments discussed herein.

FIG. 5 provides an operational example of an expected query for an underlying database associated with a query-compliant hash database in accordance with some embodiments discussed herein.

Figure 6:
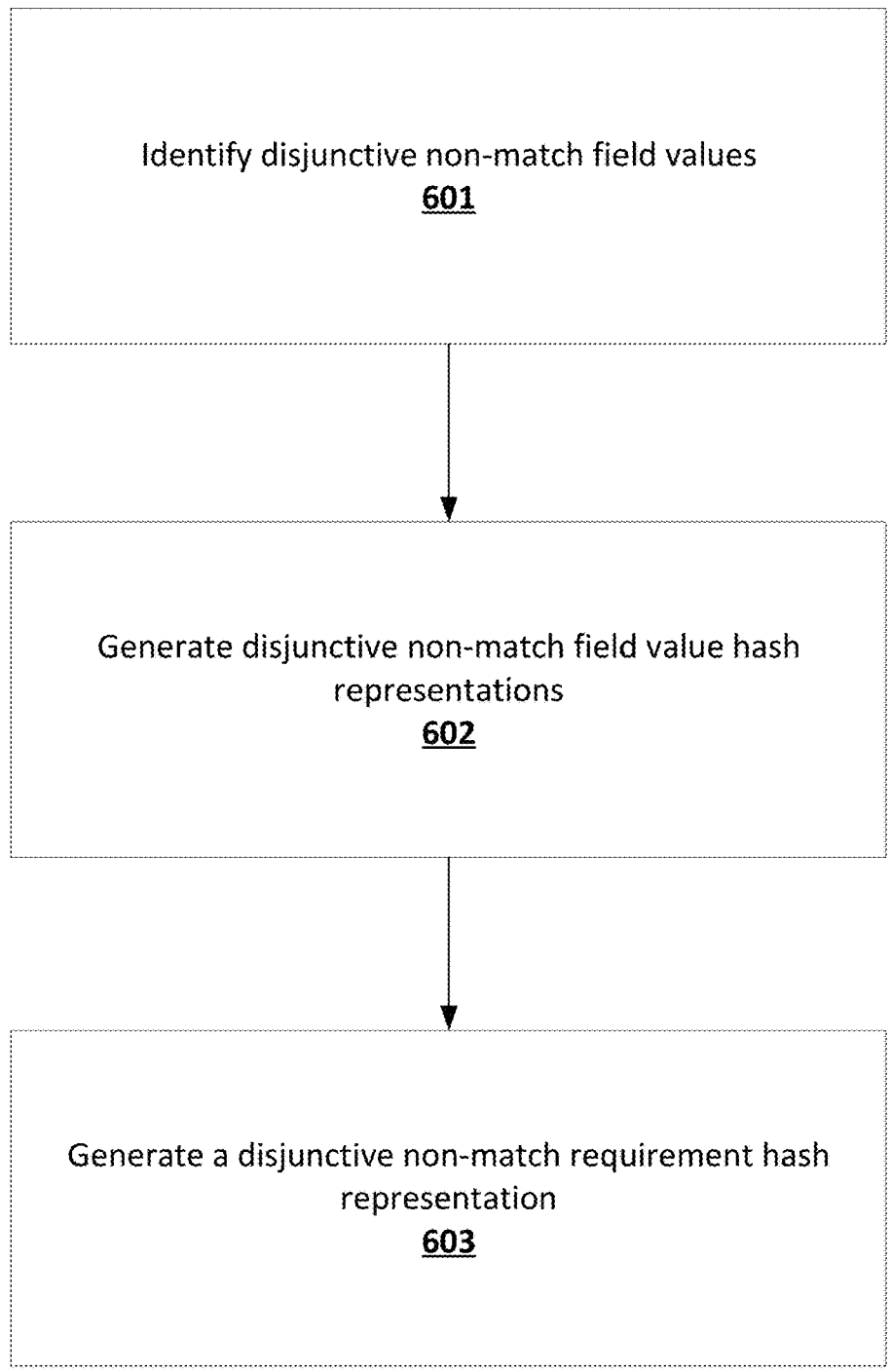

FIG. 6 is a flowchart diagram of an example process for generating the disjunctive non-match requirement hash representation for a particular disjunctive non-match requirement of a particular hashing input data object in accordance with some embodiments discussed herein.

Figure 7:
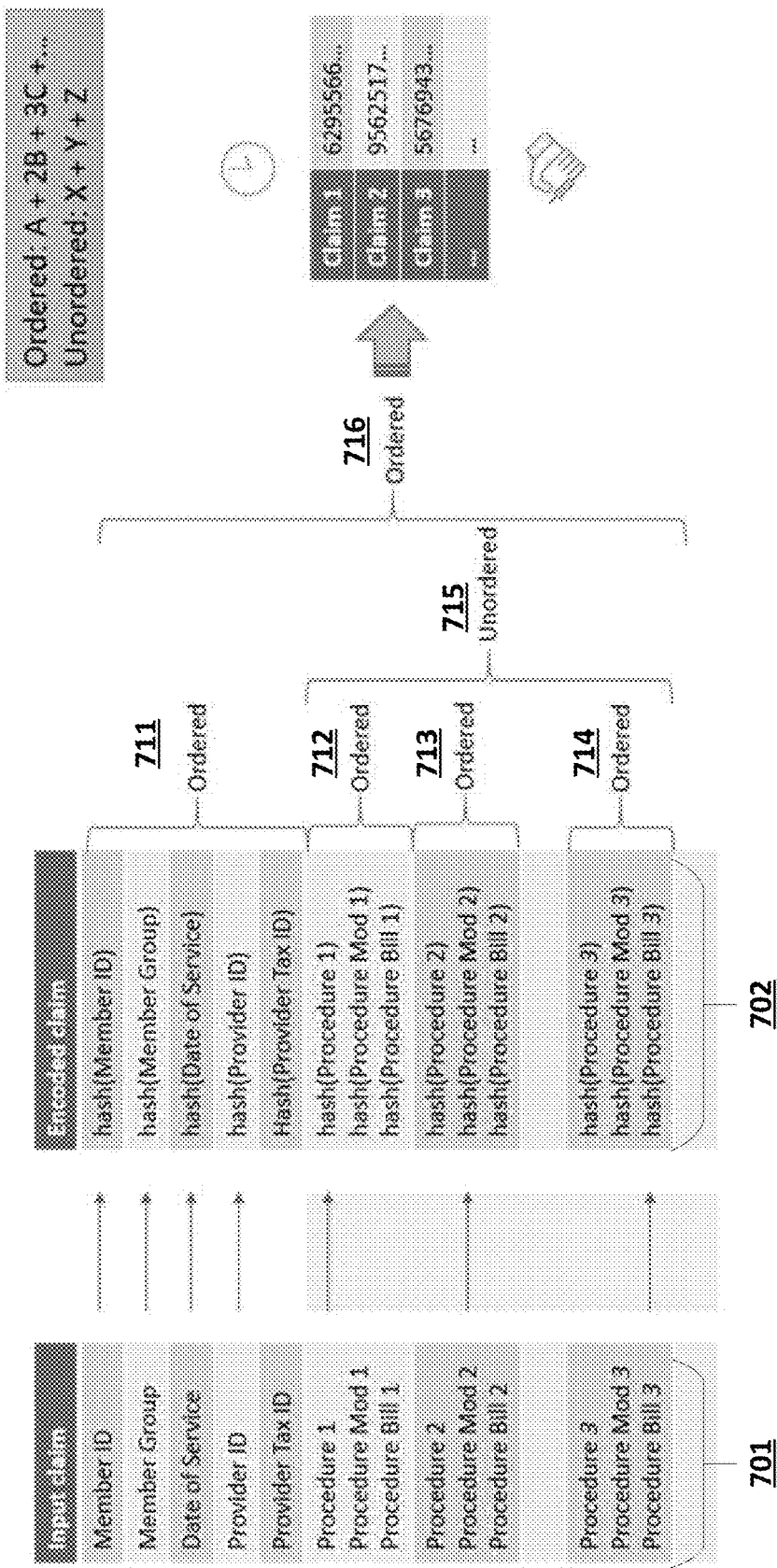

FIG. 7 provides an operational example of performing a set of hash merger operations in accordance with some embodiments discussed herein.

Figure 8:
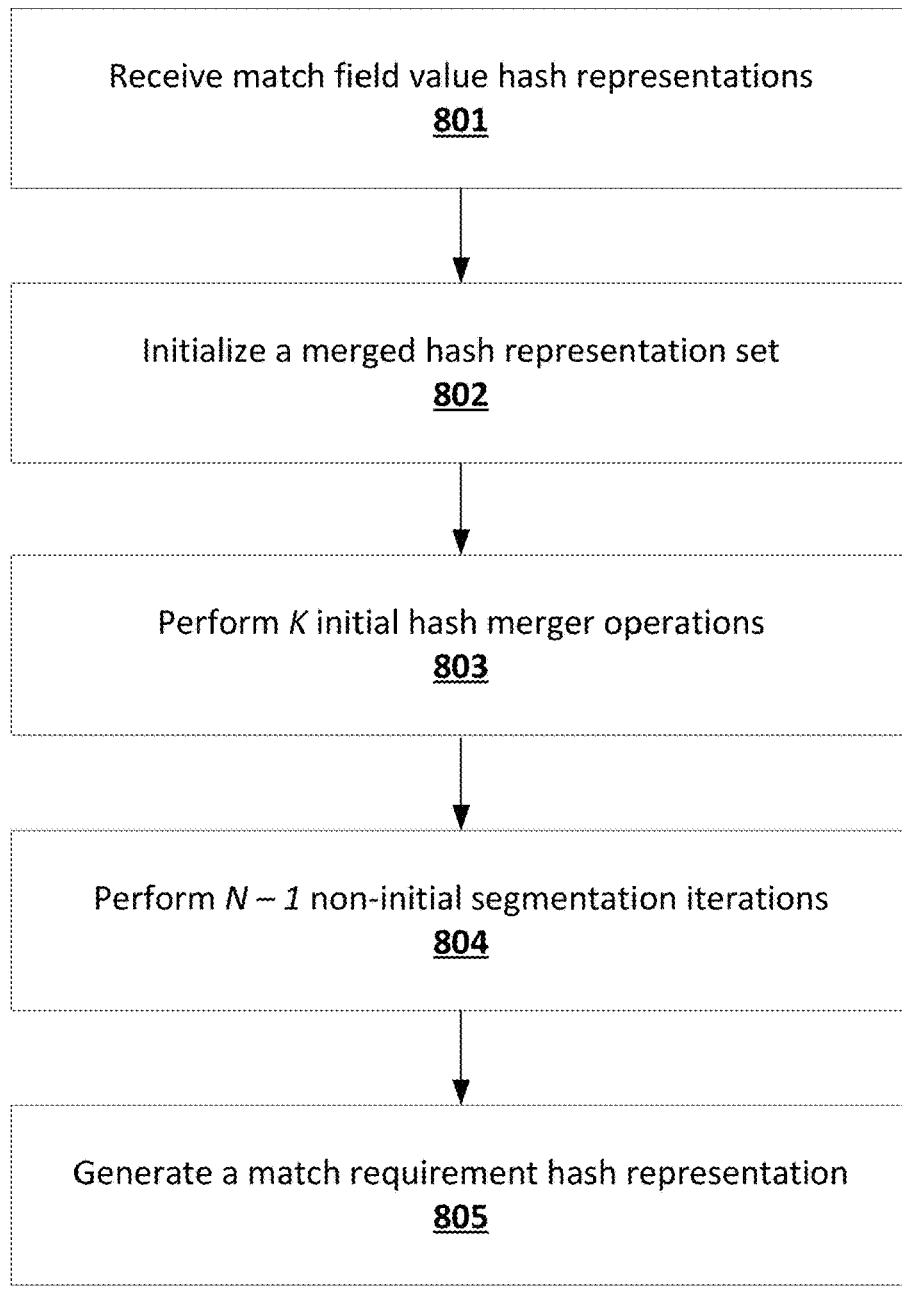

FIG. 8 is a flowchart diagram of an example process for performing N segmentation iterations of a segmentation model in accordance with some embodiments discussed herein.

Figure 9:
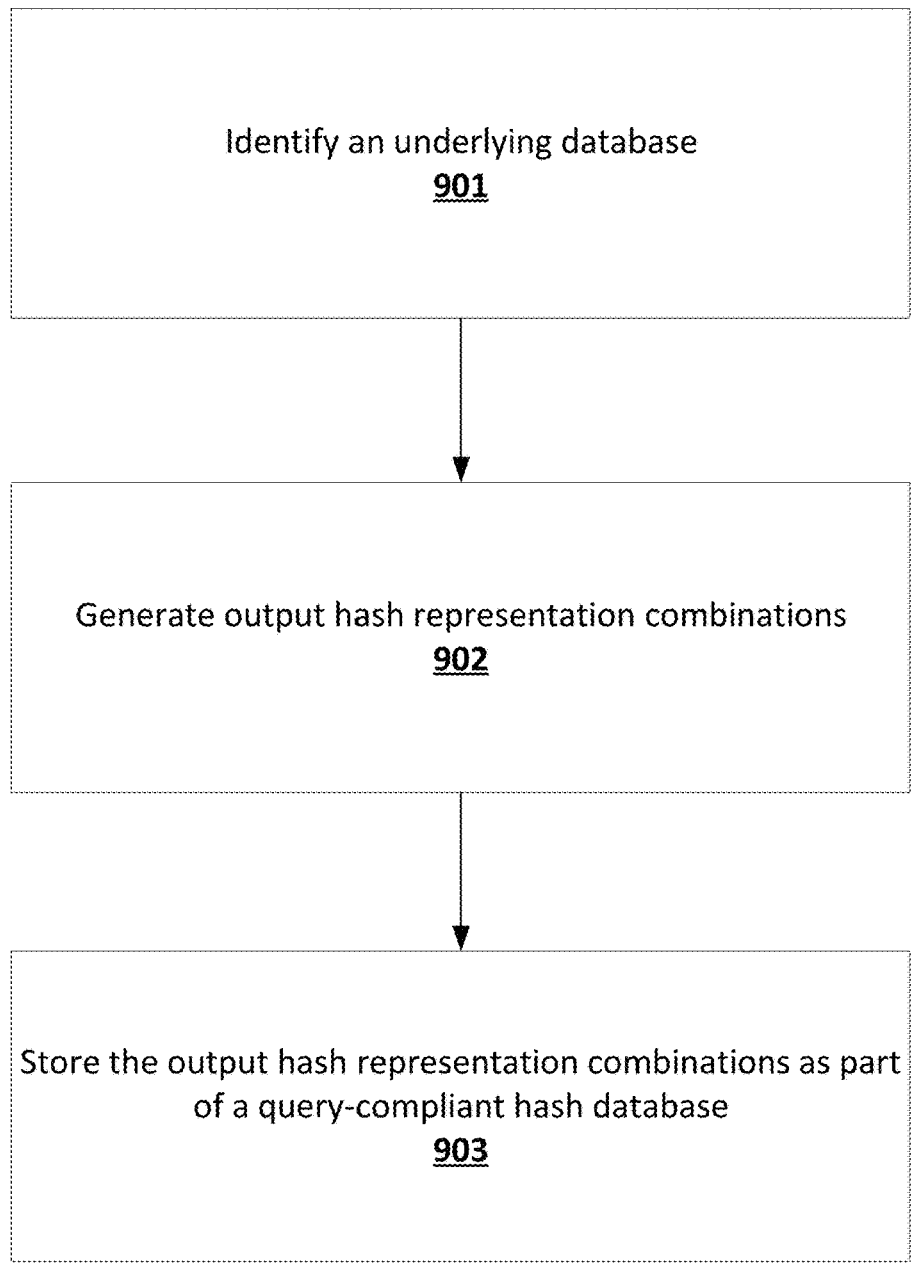

FIG. 9 is a flowchart diagram of an example process for generating a query-compliant hash database in accordance with some embodiments discussed herein.

Figure 10:
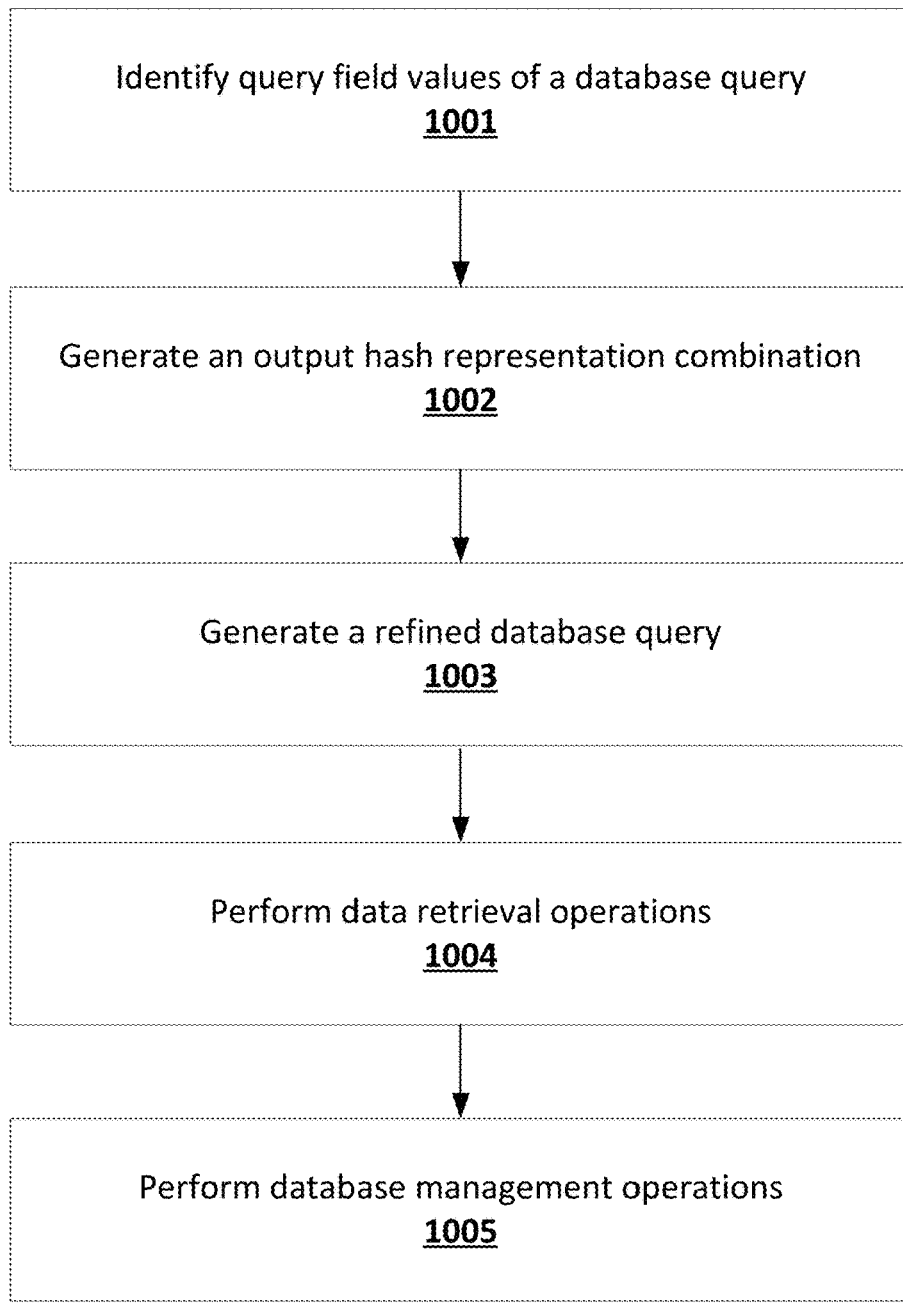

FIG. 10 is a flowchart diagram of an example process for processing a database query for an underlying database of a query-compliant hash database in accordance with some embodiments discussed herein.

FIGS. 11-12 provide operational examples of two refined database queries in accordance with some embodiments discussed herein.

FIG. 13 provides an operational example of a query output user interface in accordance with some embodiments discussed herein.

FIGS. 14A-14D provide operational examples of various states of a merged hash representation set during N segmentation iterations of a segmentation model in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention make important technical contributions to improving storage efficiency (i.e., the amount of storage resources needed to store data associated with) a database system by storing an underlying database as a query-compliant hash database that is generated based at least in part on expected query structures for expected queries (e.g., common queries, queries that are determined to be regular occurring based at least in part on query frequency data associated with the database systems, and/or the like) of the underlying database. In some embodiments, given an underlying database that is associated with E expected query structures, where each ith expected query structures of the E expected query structure is associated with $F_i$ disjunctive non-match requirements and $G_i$ conjunctive non-match fields, the query-compliant hash database includes $$\sum_{i=1}^{E}(F_i + G_i + 1)$$

hash representations, including, for each of the E expected query structures: (i) a number of disjunctive non-match requirement hash representations equal to the number of disjunctive non-match requirements of the expected query structure, (ii) a number of conjunctive non-match field value hash representations equal to the number of conjunctive non-match fields of the expected query structure, and (iii) a match requirement hash representation for the match requirement of the expected query. From a storage-wise standpoint, this is much more resource efficient than storing the values of the database entries of the underlying database. This is because: (i) hash representations are smaller (i.e., can be stored using a lower number of bits) than non-hash representations, and (ii) hash representations for various data field values can be combined to generate match requirement hash representations and disjunctive non-match requirement hash representations, thus avoiding the need for separate storage of data pertaining to match field values and disjunctive non-match field values of a disjunctive non-match requirement.

For example, consider an exemplary underlying database that is associated with the expected query structure that requires a match across fields F1 and F2, a disjunctive non-match across fields F3 and F4, and a non-match across field F5. Without using the query-compliant hashing techniques described herein, storing each database entry will have a storage requirement of $O(H*5)$, where H is the average storage cost of an underlying database field value. However, using at least some of the query-compliant hashing techniques described herein, a database entry will be stored as a combination of three hash representations: a match requirement hash representation, a disjunctive non-match requirement hash representation, and a conjunctive non-match field value hash representation. Thus, using at least some of the query-compliant hashing techniques described herein, storing each database entry will have a storage requirement of $O(J*3)$, where J is the average storage cost of a hash representation (which is typically less than H).

Various embodiments of the present invention make important technical contributions to improving computational efficiency of (i.e., reducing the amount of computational resources needed to perform) database query/retrieval operations. In some embodiments, given a refined database query that is associated with O match field values, P disjunctive non-match field values associated with Q disjunctive non-match requirements, and R conjunctive non-match field values, using at least some of the query-compliant hashing techniques described herein, executing the refined database query has a computational complexity of $O(Q+R)$. However, without using at least some of the query-compliant hashing techniques described herein, executing a non-refined database query corresponding to the refined database query may in some cases have a computational complexity $O(O+P+R)$, where $O+P+R$ is by definition larger than $Q+R$ as $Q<P$ and $P>=0$. Accordingly, using at least some of the query-compliant hashing techniques described herein reduces the computational complexity of executing operations corresponding to database queries, and thus reduces the computational efficiency of performing database retrieval operations.

Moreover, using at least some of the query-compliant hashing techniques described herein, given a list of O match field values, where $O>1$, performing database query/retrieval operations by matching across the O match field values would require one matching operation, and thus have a constant computational complexity. However, without using at least some of the query-compliant hashing techniques described herein, performing database query/retrieval operations by matching across the O match field values would require O! matching operations (e.g., because of the operations associated with explicit coding and checking in Structured Query Language (SQL) like frameworks), and would have the non-constant computational complexity of $O(O!)$. In this way, various embodiments of the present invention make additional important technical contributions to improving computational efficiency of (i.e., reducing the amount of computational resources needed to perform) database query/retrieval operations. In addition, by describing techniques for storing one hashed representation for O match field values, instead of O hashed or non-hashed representations for O match field values, various embodiments of the present invention describe techniques for reducing storage requirements of (i.e., the amount of storage resources needed for storing data associated with) database systems.

II. Definitions of Certain Terms

The term "expected query structure" may refer to a data construct that describes: (i) a set of requirements associated with expected queries for a query-compliant hash database, and (ii) for each requirement, a logical designation of the requirement (e.g., a logical designation describing whether the requirement is a match requirement, a disjunctive non-match requirement, or a conjunctive non-match requirement) and the data fields that are associated with the requirement. For example, an expected query structure may describe that expected queries for the query-compliant hash database include a match requirement that is associated with fields F1 and F2, a first disjunctive non-match requirement that is associated with fields F3 and F4, a second disjunctive non-match requirement that is associated with fields F5 and F6, and a conjunctive non-match requirement that is associated with field F7.

The term "match requirement" may refer to a data construct that describes a requirement that may be inferred from a database query, where the requirement requires retrieval of those database entries that (among other potential requirements) have matching values for a set of fields associated with the match requirement, referred to herein as "match fields." For example, if a database query requires retrieval of those database entries that have the member_name "John Smith," the member_ID 123456, and are associated with the following set of service lines {(service_ID=1234, service_date=1/29/2022), (service_ID=3456, service, service_date=1/28/2022)}, then the database query is associated with a match requirement that is in turn associated with the following match fields: member_name, member_ID, service_ID, and service_date. In some embodiments, an expected query structure is associated with one match requirement that may be associated with any number of one or more match fields, where one or more defined subsets of the match field values corresponding to the match fields may each be grouped together to generate a match segment.

The term "disjunctive non-match requirement" may refer to a data construct that describes a requirement that may be inferred from a database query, where the requirement requires retrieval of those database entries that (among other potential requirements) have non-matching values for at least one field of a set of fields associated with the disjunctive non-match requirement. For example, if a database query requires retrieval of those database entries that either have a member_state value that is different from member_state="Georgia" or a member_city value that is different from member_city="Rome," then the database query is associated with a disjunctive non-match requirement that is associated with the following disjunctive non-match fields: member_state and member_city. In some embodiments, an expected query structure can define any number of one or more disjunctive non-match requirements, where each disjunctive non-match requirement may be associated with any number of two or more disjunctive non-match fields. Accordingly, while various embodiments of the present invention are described with reference to an expected query structure having a single disjunctive non-match requirement, a person of ordinary skill in the relevant technology will recognize that the disclosed techniques can be extended to generate output hash representation combinations based at least in part on expected query structures having two or more disjunctive non-match requirements.

The term "conjunctive non-match requirement" may refer to a data construct that describes a requirement that may be inferred from a database query, where the requirement requires retrieval of those database entries that (among other potential requirements) have non-matching values for all of a set of one or more fields associated with the conjunctive non-match requirement. For example, if a database query requires retrieval of those database entries that have an insurance_carrier_ID value that is different from the insurance_carrier_ID="UHG", then the database query is associated with a conjunctive non-match requirement that is in turn associated with the following conjunctive non-match field: insurance_carrier_ID. In some embodiments, an expected query structure is associated with one conjunctive non-match requirement that may be associated with any number of one or more conjunctive non-match fields.

The term "hashing input data object" may refer to a data construct that describes a data object that describes a set of data field values associated with a set of data fields, where the set of data field values are configured to be hashed in accordance with hashing operations that are determined based at least in part on associations between the set of data fields and a set of requirements and the associations between the set of requirements and a set of logical designations for the requirements, as defined by the expected query structure. In some embodiments, the hashing input data object is a database entry data object that describes data field values of a database entry of an underlying database that is hashed to generate the query-compliant hash database, such that the output hash representation combinations for database entries of an underlying database can be used to generate the query-compliant hash database. In some embodiments, the hashing input data object is a database query data object that describes data field values of a database query for the underlying database that is hashed to generate the query-compliant hash database, such that the output hash representation combinations for a database query can be used to query the query-compliant hash database after the query-compliant hash database is generated.

The term "match field" may refer to a data construct that describes a data type associated with a hashing input data object that is expected to be subject to a match requirement based at least in part on the corresponding expected query structure. For example, expected queries to a query-compliant hash database may seek retrieval of those database entries that have the same provider identifier as the provider identifier specified in the query. In this example, the provider identifier field is subject to a match requirement, as the query structure of the noted expected queries require a match across data values associated with the provider identifier field. Accordingly, if a hashing input data object has a provider identifier value associated with the provider identifier field, the hash representation of the provider identifier value may be combined with hash representations of other data field values that are associated with match fields of the hashing input data object in accordance with the techniques described herein to generate a matching requirement hash representation, as further described below. In some embodiments, a match field value is a data field value described by a match field.

The term "match field value hash representation" may refer to a data construct that describes a hash representation of a match field value described by a match field. In some embodiments, given a set of A match field values, A corresponding match field value hash representations are generated, where each match field value hash representation is a hash representation of a corresponding match field value. For example, given a total amount field that is a match field, and given a hashing input data object that describes a total amount value of $2000, the match field value hash representation of the hashing input data object may be a hash representation of the value 2000. As another example, given a member name field that is a match field, and given a hashing input data object that describes a member name value of "John Smith," the match field value hash representation of the hashing input data object may be a hash representation of the string "John Smith."

The term "disjunctive non-match field" may refer to a data construct that describes a data type associated with a hashing input data object that is expected to be subject to a disjunctive non-match requirement based at least in part on the corresponding expected query structure. For example, expected queries to a query-compliant hash database may seek retrieval of those database entries that either have a different member city descriptor value relative to the member city descriptors values described by the expected queries, or a different member state descriptor value relative to the member city descriptor values described by the expected queries, but not both, such that a database entry will not be retrieved in response to a particular expected query if the database entry has both the same member city descriptor value and the same member state descriptor value as the corresponding member city descriptor value and the member state descriptor value of the particular expected query (e.g., if the expected query allows for retrieval of database entries satisfying at most one of member_city="Rome" and member_state="Georgia", a database entry associated with Rome, Ga. will not be retrieved, but a database entry associated with Rome, Massachusetts may be retrieved if other conditions specified by the query are satisfied). In this example, each of the member city descriptor field and the member state descriptor field is a disjunctive non-match field that is associated with a common disjunctive non-match requirement, where the disjunctive non-match requirement requires that, for a database entry to satisfy the requirements of an expected database query, at least one of the two database values of the database entry that correspond to the member city descriptor field and the member state descriptor field respectively be different from the corresponding query values of the expected query. In general, an expected database query may have any number of disjunctive non-match requirements, where each individual disjunctive non-match requirement may be associated with any number of two or more disjunctive non-match data fields. In some embodiments, a disjunctive non-match field value is a data field value associated with a disjunctive non-match field.

The term "disjunctive non-match requirement hash representation" may refer to a data construct that describes a combined hash representation for all of the disjunctive non-match field values of a hashing input data object that correspond to disjunctive non-match fields of a corresponding disjunctive non-match requirement. For example, given an exemplary disjunctive non-match requirement that is associated with the disjunctive non-match fields F1, F2, and F3, as well as a particular hashing input data object that specifies the disjunctive non-match field value V1 for F1, the disjunctive non-match field value V2 for F2, and the disjunctive non-match field value V3 for F3, a disjunctive non-match requirement hash representation for the hashing input data object may be generated based at least in part on a summation of a hash representation for V1, a hash representation of V2, and a hash representation of V3. In some embodiments, the non-match requirement hash representation for a disjunctive non-match requirement of a hashing input data object is generated by combining (e.g., adding up) disjunctive non-match field value hash representations for disjunctive non-match field values of the hashing input data object that are associated with the particular disjunctive non-match requirement, where a disjunctive non-match field value hash representation is a hash representation of a disjunctive non-match field value described by a disjunctive non-match field.

The term "conjunctive non-match field" may refer to a data construct that describes a data type associated with a hashing input data object that is expected to be subject to a conjunctive non-match requirement based at least in part on the corresponding expected query structure. For example, expected queries to a query-compliant hash database may seek retrieval of those database entries that have a different insurance provider identifier value relative to the insurance provider identifier values described by the expected queries and a different member category code value relative to the member category code values described by the expected queries, such that a database entry will not be retrieved in response to a particular expected query if the database entry has either the same insurance provider identifier value or the same member category code value as the corresponding insurance provider identifier value and the member category code value of the particular expected query (e.g., if the expected query prevents retrieval of database entries satisfying either of insurance_provider_ID=1213 or member_category_code=B, then any database entry associated with an insurance provider identifier value of 1213 or with a member category code value of B is not retrieved, but a database entry associated an insurance provider identifier value of 1214 and with a member category code value of C can be retrieved). In this example, each of the insurance provider identifier field and the member category code field is a conjunctive non-match field that is associated with a conjunctive non-match requirement, where the conjunctive non-match requirement requires that, for a database entry to satisfy the requirements of an expected database query, both of the two database values of the database entry that correspond to the insurance provider identifier field and the member category code field respectively be different from the corresponding query values of the expected query. In some embodiments, a conjunctive non-match field value is a data field value that is associated with a conjunctive non-match field.

The term "conjunctive non-match field value hash representation" may refer to a data construct that describes a hash representation of a data field value of the hashing input data object that corresponds to a conjunctive non-match field. For example, if a hashing input data object is associated with a first data field value admission_date=1/29/2021 and a second data field value insurance_provider_ID="1213", and if both the admission_date data field and the insurance_provider_ID are conjunctive non-match fields, then a segmentation-based hashing model generates a hash representation of the first data value as a first conjunctive non-match field value hash representation and a hash representation of the second data value as a second conjunctive non-match field value hash representation. Importantly, in some embodiments, the segmentation-based hashing model does not combine the C conjunctive non-match field value hash representations of C conjunctive non-match fields of a hashing input data object to generate a conjunctive non-match requirement hash representation for the hashing input data object.

The term "segmentation scheme" may refer to a data construct that describes how the hash representations of match field values defined by an expected query structure may be iteratively combined to generate a final segment that includes all of the noted hash representations. For example, consider an exemplary scenario in which the set of A match field values are associated with a member_name field, a member_ID field, a service_ID field that may repeat across each of L service lines, and a provider_ID that may repeat across each L service lines. An exemplary hashing input data object that corresponds to this structure is a database query that requests retrieval of database entries that: (i) have the same member_name as "John Smith," (ii) have the same member_ID as 12345, and (iii) have the following set of two service lines (i.e., L=2) in any order: {(service_ID=1454, provider_ID=564), (service_ID=1351, provider_ID=744)}. In this example, a segmentation schema may define the following segments: (i) a segment S1=[member_name, member_ID], which is an ordered list associated with the match fields member_name and member_ID, (ii) L segment S2s, where each segment S2$_i$=[service_ID$_i$, provider_ID$_i$] is an ordered list of the service_ID and the provider_ID for an ith service line of the L service lines, (iii) a segment S3={S2$_i$} for i=1 . . . L that is an unordered set of all S2 segments across the L service lines, and (iv) a final segment S4=[S1, S3] that is an ordered list of segment S1 and segment S3. In some embodiments, [ ] are used herein to denote ordered lists, while { } are used to denote unordered lists, as those terms are further described below.

The term "hash merger operation" may refer to a data construct that describes a computer-implemented operation that combines two or more hash representations to generate a resulting merged hash representations. For example, consider the exemplary segmentation schema that defines the following segments: (i) a segment S1=[member_name, member_ID], which is an ordered list associated with the match fields member_name and member_ID, (ii) L segment S2s, where each segment S2$_i$=[service_ID$_i$, provider_ID$_i$] is an ordered list of the service_ID and the provider_ID for an ith service line of the L service lines, (iii) a segment S3={S2$_i$} for i=1 . . . L that is an unordered set of all S2 segments across the L service lines, and (iv) a final segment S4=[S1, S3] that is an ordered list of segment S1 and segment S3. In this example, the segment S1 may be associated with a first hash merger operation that is configured to perform an ordered list generation operation on the hashed representation for the member_name field value for a hashing input data object and the hashed representation for the member_ID value for a hashing input data object to generate a first resulting hash representation; the S2 segments may be associated with L second hash merger operations, where each second hash merger operation may be associated with an ith service line and be configured to perform an ordered list generation operation on the hashed representation for the service_ID$_i$ value for the ith service line of the hashing input data object and the hashed representation for the provider_ID$_i$ value for the ith service line to generate a segment a second resulting hash representation; the segment S3 may be associated with a third hash merger operation that is configured to perform an unordered set generation operation on the L second resulting hash representations generated by the L second hash merger operations to generate a third resulting hash representation, and the segment S4 may be associated with a fourth hash merger operation that is configured to perform an ordered list generation operation on the first resulting hash representation and the third resulting hash representation to generate a final merged hash representation that may be adopted as a match requirement hash representation for the hashing input data object. In some embodiments, a hash merger operation is either an unordered set generation operation or an ordered list generation operation.

The term "unordered set generation operation" may refer to a data construct that describes a computer-implemented operation that combines hash representations for two or more field values (e.g., match field value hash representations for two or more match field values) into a single merged hash representation, where the combination does not reflect/describe any ordering of the hash representations and/or any ordering of the two or more field values. For example, in some embodiments, an unordered set generation operation on data field values A, B, and C is denoted as {A, B, C} and is performed using the operations of the equation hash(A)+hash(B)+hash(C), where + is an addition operation (e.g., an addition modulo the hash width) and hash(n) is the hash representation of a data field value n. In some embodiments, each unordered set generation operation is configured to: identify an unordered sequence of input hash representation; and generate the resulting merged hash representation based at least in part on (e.g., based at least in part on the output of addition of) each input hash representation in the unordered sequence.

The term "ordered list generation operation" may refer to a data construct that describes a computer-implemented operation that combines hash representations for two or more field values (e.g., match field value hash representations for two or more match field values) into a single merged hash representation, where the combination does reflects/describes an ordering of the hash representations and/or an ordering of the two or more field values. For example, in some embodiments, an ordered list generation operation on data field values A, B, and C is denoted as {A, B, C} and is performed using the operations of the equation hash(A)+2*hash(B)+3*hash(C), where + is an addition operation (e.g., an addition modulo the hash width) and hash(n) is the hash representation of a data field value n. In general, in some embodiments, given Y input hash representations, each input hash representation is first multiplied by a sequence number that describes the position of the corresponding data field in an ordering of data fields to generate an order-aware hash representation, and then the Y order-aware hash representations are combined (e.g., summed up) to generate the merged hash representation. In some embodiments, an ordered list generation operation is configured to: identify an ordered sequence of input hash representations each associated with a sequence number; for each input hash representation, generating an order-aware hash representation based at least in part on the input hash representation and the sequence number for the input hash representation; and generate the resulting merged hash representation based at least in part on each order-aware hash representation.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magneto resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SWIM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 is a schematic diagram of an example system architecture 100 for performing database management operations described herein. The system architecture 100 includes a database management system 101 and one or more client computing entities 102. The database management system 101 may be configured to receive database management requests (e.g., database retrieval requests, database modification requests, database configuration management requests, and/or the like) from the client computing entities 102, perform database management operations (e.g., database retrieval operations, database modification operations, database configuration management operations, and/or the like) in response to the database management requests, and optionally transmit any result data generated by the database management operations to the client computing entities 102. An example of a database management operation is an operation that seeks to determine whether a claim data object described by a database query corresponds to an already-stored claim data object associated with a database stored by the database management system 101 (e.g., whether the claim data object describes a duplicate claim).

The database management system 101 may comprise a database management computing entity 106 and a storage subsystem 108. The database management computing entity 106 may be configured to receive database management requests (e.g., database retrieval requests, database modification requests, database configuration management requests, and/or the like) from the client computing entities 102, perform database management operations (e.g., database retrieval operations, database modification operations, database configuration management operations, and/or the like) in response to the database management requests, and optionally transmit any result data generated by the database management operations to the client computing entities 102. The database management computing entity 106 may further be configured to, using some of the techniques described herein, generate a query-compliant hash database 111 based at least in part on an underlying database 110 and store the query-compliant hash database 111 on the storage subsystem 108. The database management computing entity 106 may further be configured to, using some of the techniques described herein, execute a database query associated with the query-compliant hash database 111.

The storage subsystem 108 may store an underlying database 110, a query-compliant hash database 111, and database management configuration data 112 used by the database management computing entity 106 to perform various database management operations, to generate the query-compliant hash database 111, and/or to execute a database query associated with the query-compliant hash database 111. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Database Management Computing Entity

FIG. 2 provides a schematic of a database management computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the database management computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the database management computing entity 106 may include or be in communication with a processing element 205 (also referred to as processors, processing circuitry, and/or similar terms used herein interchangeably) that communicate with other elements within the database management computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the database management computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the database management computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the database management computing entity 106 with the assistance of the processing element 205 and operating system.

As indicated, in one embodiment, the database management computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the database management computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the database management computing entity 106 may include or be in communication with one or more input elements, such as a keyboard input, a mouse input, a touch screen/display input, motion input, movement input, audio input, pointing device input, joystick input, keypad input, and/or the like. The database management computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the database management computing entity 106. In a particular embodiment, the client computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the database management computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the database management computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the database management computing entity 106 and/or various other computing entities.

In another embodiment, the client computing entity 102 may include one or more components or functionality that are the same or similar to those of the database management computing entity 106, as described in greater detail above. As will be recognized, these frameworks and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention make important technical contributions to improving storage efficiency (i.e., the amount of storage resources needed to store data associated with) a database system by storing an underlying database as a query-compliant hash database that is generated based at least in part on expected query structures for expected queries (e.g., common queries, queries that are determined to be regular occurring based at least in part on query frequency data associated with the database systems, and/or the like) of the underlying database. In some embodiments, given an underlying database that is associated with E expected query structures, where each ith expected query structures of the E expected query structure is associated with $F_i$ disjunctive non-match requirements and $G_i$ conjunctive non-match fields, the query-compliant hash database includes $$\sum_{i=1}^{E}(F_i + G_i + 1)$$

hash representations, including, for each of the E expected query structures: (i) a number of disjunctive non-match requirement hash representations equal to the number of disjunctive non-match requirements of the expected query structure, (ii) a number of conjunctive non-match field value hash representations equal to the number of conjunctive non-match fields of the expected query structure, and (iii) a match requirement hash representation for the match requirement of the expected query. From a storage-wise standpoint, this is much more resource efficient than storing the values of the database entries of the underlying database. This is because: (i) hash representations are smaller (i.e., can be stored using a lower number of bits) than non-hash representations, and (ii) hash representations for various data field values can be combined to generate match requirement hash representations and disjunctive non-match requirement hash representations, thus avoiding the need for separate storage of data pertaining to match field values and disjunctive non-match field values of a disjunctive non-match requirement.

Furthermore, as further described below, various embodiments of the present invention make important technical contributions to improving computational efficiency of (i.e., reducing the amount of computational resources needed to perform) database query/retrieval operations. In some embodiments, given a refined database query that is associated with O match field values, P disjunctive non-match field values associated with Q disjunctive non-match requirements, and R conjunctive non-match field values, using at least some of the query-compliant hashing techniques described herein, executing the refined database query has a computational complexity of $O(Q+R)$. However, without using at least some of the query-compliant hashing techniques described herein, executing a non-refined database query corresponding to the refined database query has a computational complexity $O(O+P+R)$, where $O+P+R$ is by definition larger than $Q+R$ as $Q<P$ and $P>=0$. According, using at least some of the query-compliant hashing techniques described herein reduces the computational complexity of executing operations corresponding to database queries, and thus reduces the computational efficiency of performing database retrieval operations.

Moreover, as further described below, using at least some of the query-compliant hashing techniques described herein, given a list of O match field values, where $O>1$, performing database query/retrieval operations by matching across the O match field values would require one matching operation, and thus have a constant computational complexity. However, without using at least some of the query-compliant hashing techniques described herein, performing database query/retrieval operations by matching across the O match field values would require O! matching operations (e.g., because of the operations associated with explicit coding and checking in Structured Query Language (SQL) like frameworks), and would have the non-constant computational complexity of $O(O!)$. In this way, various embodiments of the present invention make additional important technical contributions to improving computational efficiency of (i.e., reducing the amount of computational resources needed to perform) database query/retrieval operations. Moreover, by describing techniques for storing one hashed representation for O match field values, instead of O hashed or non-hashed representations for O match field values, various embodiments of the present invention describe techniques for reducing storage requirements of (i.e., the amount of storage resources needed for storing data associated with) database systems.

FIG. 4 is a data flow diagram of an example process 400 for generating an output hash representation combination 411 for a hashing input data object 402 associated with a query-compliant hash database 111 whose database entries are hashed in accordance with an expected query structure 401 of expected queries for an underlying database associated with the query-compliant hash database 111. In some embodiments, the hashing input data object 402 is a database query for the query-compliant hash database 111, while in other embodiments, the hashing input data object 402 is a database entry of an underlying database that can be used to generate the query-compliant hash database 111. Accordingly, the steps/operations described in relation to process 400 can be used both to generate the database entries of the query-compliant hash database 111 and to generate database queries used to conditionally retrieve a subset of the database entries of the query-compliant hash database 111 that satisfy the conditions specified by the database queries.

The process 400 begins when a segmentation-based hashing model 421 identifies (e.g., receives) the expected query structure 401. The expected query structure 401 may describe: (i) a set of requirements associated with expected queries for the query-compliant hash database 111, and (ii) for each requirement, a logical designation of the requirement (e.g., a logical designation describing whether the requirement is a match requirement, a disjunctive non-match requirement, or a conjunctive non-match requirement) and the data fields that are associated with the requirement. For example, the expected query structure 401 may describe that expected queries for the query-compliant hash database 111 include a match requirement that is associated with fields F1 and F2, a first disjunctive non-match requirement that is associated with fields F3 and F4, a second disjunctive non-match requirement that is associated with fields F5 and F6, and a conjunctive non-match requirement that is associated with field F7. An example of an expected query that corresponds to this expected query structure 401 is depicted in FIG. 5, where F1 is the member_name field, F2 is the member_ID field, F3 is the hospital_ID field, F4 is the provider_ID field, F5 is the state_name field, F6 is the city_name field, and F7 is the admission_date field. In the operational example of FIG. 5, the member_name field has a "John Smith" field value, the member_ID field has a 12345 field value, the hospital_ID field has a 3543 field value, the provider_ID field has a 222 field value, the state_name field has a "Georgia" field value, the city_name field has a "Rome" field value, and the admission_date has a Jan. 29, 2022 field value.

In some embodiments, a match requirement is a requirement that may be inferred from a database query, where the requirement requires retrieval of those database entries that (among other potential requirements) have matching values for a set of fields associated with the match requirement, referred to herein as "match fields." For example, if a database query requires retrieval of those database entries that have the member_name "John Smith," the member_ID 123456, and are associated with the following set of service lines {(service_ID=1234, service_date=1/29/2022), (service_ID=3456, service, service_date=Jan. 28, 2022)}, then the database query is associated with the following match requirement that is in turn associated with the following match fields: member_name, member_ID, service_ID, and service_date. In some embodiments, an expected query structure is associated with one match requirement that may be associated with any number of one or more match fields, where one or more defined subsets of the match field values corresponding to the match fields may each be grouped together to generate a match segment, as further described below.

In some embodiments, a disjunctive non-match requirement is a requirement that may be inferred from a database query, where the requirement requires retrieval of those database entries that (among other potential requirements) have non-matching values for at least one field of a set of fields associated with the disjunctive non-match requirement. For example, if a database query requires retrieval of those database entries that either have a member_state value that is different from member_state="Georgia" or a member_city value that is different from member_city="Rome," then the database query is associated with a disjunctive non-match requirement that is associated with the following disjunctive non-match fields: member_state and member_city. In some embodiments, an expected query structure can define any number of one or more disjunctive non-match requirements, where each disjunctive non-match requirement may be associated with any number of two or more disjunctive non-match fields. Accordingly, while various embodiments of the present invention are described with reference to an expected query structure having a single disjunctive non-match requirement, a person of ordinary skill in the relevant technology will recognize that the disclosed techniques can be extended to generate output hash representation combinations based at least in part on expected query structures having two or more disjunctive non-match requirements.

In some embodiments, a conjunctive non-match requirement is a requirement that may be inferred from a database query, where the requirement requires retrieval of those database entries that (among other potential requirements) have non-matching values for all of a set of one or more fields associated with the conjunctive non-match requirement. For example, if a database query requires retrieval of those database entries that have an insurance_carrier_ID value that is different from insurance_carrier_ID="UHG", then the database query is associated with a conjunctive non-match requirement that is in turn associated with the following conjunctive non-match field: insurance_carrier_ID. In some embodiments, an expected query structure is associated with one conjunctive non-match requirement that may be associated with any number of one or more conjunctive non-match fields.

As further depicted in FIG. 4, the process 400 continues when the segmentation-based hashing model 421 identifies (e.g., receives) the hashing input data object 402. The hashing input data object 402 can be any data object that describes a set of data field values associated with a set of data fields, where the set of data field values are configured to be hashed in accordance with hashing operations that are determined based at least in part on associations between the set of data fields and a set of requirements and the associations between the set of requirements and a set of logical designations for the requirements, as defined by the expected query structure 401. In some embodiments, the hashing input data object 402 is a database entry data object that describes data field values of a database entry of an underlying database that is hashed to generate the query-compliant hash database 111, such that the output hash representation combinations generated by the process 400 can be used to generate the query-compliant hash database 111. In some embodiments, the hashing input data object 402 is a database query data object that describes data field values of a database query for the underlying database that is hashed to generate the query-compliant hash database 111, such that the output hash representation combinations generated by the process 400 can be used to query the query-compliant hash database 111 after the query-compliant hash database 111 is generated.

The process 400 continues when the segmentation-based hashing model 421 generates: (i) a set of A match field value hash representations 431 for a set of A match field values corresponding to match fields of the hashing input data object 402, (ii) a set of B disjunctive non-match hash representations 432 for a set of B disjunctive non-match hash representations of the hashing input data object 402, and optionally (iii) a set of C conjunctive non-match field value hash representations 433 for a set of C conjunctive non-match field values that correspond to C conjunctive non-match fields of the hashing input data object 402. The segmentation-based hashing model 421 also provides the set of A match field value hash representations 431 to a segmentation model 422.

In some embodiments, the segmentation-based hashing model 421 is configured to classify each data field of a hashing input data object 402 (e.g., each query field described by a database query data object or each entry field described by a database entry data object) as one of the following: (i) a match field, (ii) a disjunctive non-match field, and (iii) a conjunctive non-match field. A match field may describe a data type associated with a hashing input data object that is expected to be subject to a match requirement based at least in part on the corresponding expected query structure. For example, expected queries to a query-compliant hash database may seek retrieval of those database entries that have the same provider identifier as the provider identifier specified in the query. In this example, the provider identifier field is subject to a match requirement, as the query structure of the noted expected queries require a match across field values associated with the provider identifier field. Accordingly, if a hashing input data object has a provider identifier value associated with the provider identifier field, the hash representation of the provider identifier value may be combined with hash representations of other data field values that are associated with match fields of the hashing input data object in accordance with the techniques described herein to generate a matching requirement hash representation, as further described below. In some embodiments, a match field value is a data field value described by a match field.

In an exemplary embodiment, an expected database query for a query-complaint hash database seeks retrieval of database entries that have: (i) the same total amount value as the total amount value of the database query, (ii) the same combination of a member group value and a member name value as the corresponding combination described by the database query, (iii) a different claim date value as the claim date value of the database query, (iv) a different combination of a hospital identifier value and a provider identifier value as the corresponding combination described by the database query, and (v) a different combination of a member state descriptor value and a member city descriptor value as the corresponding combination described by the database query. In this example, each of the following fields is a match field: the total amount field, the member group field, and the member name field. This is because, for a database entry to match the criteria described by a database query, all three of the noted data fields must be common/identical across the database entry and the database query. Accordingly, the noted three fields are deemed to be associated with a match requirement as described herein.

A match field value hash representation is a hash representation of a match field value described by a match field. In some embodiments, given a set of A match field values, A corresponding match field value hash representations are generated, where each match field value hash representation is a hash representation of a corresponding match field value. For example, given a total amount field that is a match field, and given a hashing input data object that describes a total amount value of $2000, the match field value hash representation of the hashing input data object may be a hash representation of the value 2000. As another example, given a member name field that is a match field, and given a hashing input data object that describes a member name value of "John Smith," the match field value hash representation of the hashing input data object may be a hash representation of the string "John Smith."

A disjunctive non-match field may describe a data type associated with a hashing input data object that is expected to be subject to a disjunctive non-match requirement based at least in part on the corresponding expected query structure. For example, expected queries to a query-compliant hash database may seek retrieval of those database entries that either have a different member city descriptor value relative to the member city descriptors values described by the expected queries, or a different member state descriptor value relative to the member city descriptor values described by the expected queries, but not both, such that a database entry will not be retrieved in response to a particular expected query if the database entry has both the same member city descriptor value and the same member state descriptor value as the corresponding member city descriptor value and the member state descriptor value of the particular expected query (e.g., if the expected query allows for retrieval of database entries satisfying at most one of member_city="Rome" and member_state="Georgia", a database entry associated with Rome, Ga. will not be retrieved, but a database entry associated with Rome, Massachusetts may be retrieved if other conditions specified by the query are satisfied). In this example, each of the member city descriptor field and the member state descriptor field is a disjunctive non-match field that is associated with a common disjunctive non-match requirement, where the disjunctive non-match requirement requires that, for a database entry to satisfy the requirements of an expected database query, at least one of the two database values of the database entry that correspond to the member city descriptor field and the member state descriptor field respectively be different from the corresponding query values of the expected query. In general, an expected database query may have any number of disjunctive non-match requirements, where each individual disjunctive non-match requirement may be associated with any number of two or more disjunctive non-match data fields. In some embodiments, a disjunctive non-match field value is a data field value associated with a disjunctive non-match field.

In an exemplary embodiment, an expected database query for a query-complaint hash database seeks retrieval of database entries that have: (i) the same total amount value as the total amount value of the database query, (ii) the same combination of a member group value and a member name value as the corresponding combination described by the database query, (iii) a different claim date value as the claim date value of the database query, (iv) a different combination of a hospital identifier value and a provider identifier value as the corresponding combination described by the database query, and (iv) a different combination of a member state descriptor value and a member city descriptor value as the corresponding combination described by the database query. In this example, each of the noted data fields is a disjunctive non-match field for a first disjunctive non-match requirement: the hospital identifier field and the provider identifier field. This is because, for a database entry to match the criteria described by a database query, at least one of the two noted data fields must be different across the database entry and the database query. Moreover, in this example, each of the noted data fields is a disjunctive non-match field for a second disjunctive non-match requirement: the member state descriptor field and the member city descriptor field. This is because, for a database entry to match the criteria described by a database query, at least one of the two noted data fields must be different across the database entry and the database query.

In some embodiments, a disjunctive non-match requirement may be a condition specified by an expected query for a query-compliant hash database that requires that, of two or more data fields that are associated with the disjunctive non-match requirement, at least one be different across a database entry and a database query before a determination that the database entry satisfies the requirements of the database query can be reached. As described above, an expected database query may have any number of disjunctive non-match requirements, where each individual disjunctive non-match requirement may be associated with any number of two or more disjunctive non-match data fields.

While various embodiments of the present invention are described with reference to an expected query structure having a single disjunctive non-match requirement, a person of ordinary skill in the relevant technology will recognize that the disclosed techniques can be extended to generate disjunctive non-match requirement hash representations for hashing input data objects that are associated with an expected query structure having two or more disjunctive non-match requirements. To do so, the segmentation-based hashing model 421 may perform steps/operations of the process 600 B times with respect to each hashing input data object, where B is the number of disjunctive non-match requirements of a particular hashing input data object as defined by the expected query structure associated with the particular hashing input data object, and where each execution of the process 600 generates the disjunctive non-match requirement hash representation of a corresponding disjunctive non-match requirement of the B disjunctive non-match requirements of the particular hashing input data object.

Accordingly, FIG. 6 is a flowchart diagram of an example process 600 for generating the disjunctive non-match requirement hash representation for a particular disjunctive non-match requirement of a particular hashing input data object that is associated with a set of two or more disjunctive non-match fields. The process 600 will be described with reference to an exemplary disjunctive non-match requirement that is associated with the disjunctive non-match fields F1, F2, and F3, as well as a particular hashing input data object that specifies the disjunctive non-match field value V1 for F1, the disjunctive non-match field value V2 for F2, and the disjunctive non-match field value V3 for F3. For example, the particular hashing input data object may be a database query that requires retrieval of database entries that either have a member_state that is different than "Georgia," or a member_city that is different than "Rome," or a member_county that is different than "Floyd." In this example, F1 is the member_state field, F2 is the member_city field, F3 is the member_county field, V1 is the "Georgia" field value, V2 is the "Rome" field value, and V3 is the "Floyd" field value.

The process 600 begins at step/operation 601 when the segmentation-based hashing model 421 identifies the disjunctive non-match field values associated with the disjunctive non-match fields of the particular disjunctive non-match requirement. For example, the segmentation-based hashing model 421 identifies V1, V2, and V3 in the example noted above.

At step/operation 602, the segmentation-based hashing model 421 generates a disjunctive non-match field value hash representation for each the disjunctive non-match field value identified at step/operation 601, where each disjunctive non-match field value hash representation is a hash representation of a corresponding disjunctive non-match field value. For example, the segmentation-based hashing model 421 generates a hash representation of the disjunctive non-match field value V1, a hash representation of the disjunctive non-match field value V2, and a hash representation of the disjunctive non-match field value V3.

At step/operation 603, the segmentation-based hashing model 421 determines a disjunctive non-match requirement hash representation for the particular disjunctive non-match requirement based at least in part on each disjunctive non-match field value hash representation that is generated at step/operation 602. In some embodiments, the segmentation-based hashing model 421 combines (e.g., adds up) the non-match requirement hash representations generated at step/operation 602 to generate the non-match requirement hash representation. In some embodiments, the segmentation-based hashing model 421 performs an unordered set generation operation on the disjunctive non-match field value hash representations that are generated at step/operation 602 to generate the non-match requirement hash representation.

Accordingly, the disjunctive non-match requirement hash representation may describe a combined hash representation for all of the disjunctive non-match field values of a hashing input data object that correspond to disjunctive non-match fields of a corresponding disjunctive non-match requirement. For example, given an exemplary disjunctive non-match requirement that is associated with the disjunctive non-match fields F1, F2, and F3, as well as a particular hashing input data object that specifies the disjunctive non-match field value V1 for F1, the disjunctive non-match field value V2 for F2, and the disjunctive non-match field value V3 for F3, a disjunctive non-match requirement hash representation for the hashing input data object may be generated based at least in part on a summation of a hash representation for V1, a hash representation of V2, and a hash representation of V3. In some embodiments, the non-match requirement hash representation for a disjunctive non-match requirement of a hashing input data object is generated by combining (e.g., adding up) disjunctive non-match field value hash representations for disjunctive non-match field values of the hashing input data object that are associated with the particular disjunctive non-match requirement, where a disjunctive non-match field value hash representation is a hash representation of a disjunctive non-match field value described by a disjunctive non-match field.

Returning to FIG. 4, a conjunctive non-match field may describe a data type associated with a hashing input data object that is expected to be subject to a conjunctive non-match requirement based at least in part on the corresponding expected query structure. For example, expected queries to a query-compliant hash database may seek retrieval of those database entries that have a different insurance provider identifier value relative to the insurance provider identifier values described by the expected queries and a different member category code value relative to the member category code values described by the expected queries, such that a database entry will not be retrieved in response to a particular expected query if the database entry has either the same insurance provider identifier value or the same member category code value as the corresponding insurance provider identifier value and the member category code value of the particular expected query (e.g., if the expected query prevents retrieval of database entries satisfying either of insurance_provider_ID=1213 or member_category_code=B, then any database entry associated with an insurance provider identifier value of 1213 or with a member category code value of B is not retrieved, but a database entry associated an insurance provider identifier value of 1214 and with a member category code value of C can be retrieved). In this example, each of the insurance provider identifier field and the member category code field is a conjunctive non-match field that is associated with a conjunctive non-match requirement, where the conjunctive non-match requirement requires that, for a database entry to satisfy the requirements of an expected database query, both of the two database values of the database entry that correspond to the insurance provider identifier field and the member category code field respectively be different from the corresponding query values of the expected query. In some embodiments, a conjunctive non-match field value is a data field value that is associated with a conjunctive non-match field.

In an exemplary embodiment, an expected database query for a query-complaint hash database seeks retrieval of database entries that have: (i) the same total amount value as the total amount value of the database query, (ii) the same combination of a member group value and a member name value as the corresponding combination described by the database query, (iii) a different claim date value as the claim date value of the database query, (iv) a different combination of a hospital identifier value and a provider identifier value as the corresponding combination described by the database query, and (iv) a different combination of a member state descriptor value and a member city descriptor value as the corresponding combination described by the database query. In this example, the claim date value is a conjunctive non-match field value that is associated with a conjunctive non-match requirement. While various embodiments of the present invention are described with reference to an expected query structure having two or more conjunctive non-match fields, a person of ordinary skill in the relevant technology will recognize that the disclosed techniques can be extended to generate output hash representation combinations based at least in part on expected query structures that define only one conjunctive non-match field.

In some embodiments, the segmentation-based hashing model 421 generates, for each conjunctive non-match field value of a hashing input data object, a conjunctive non-match field value hash representation that is a hash representation of the data field value of the hashing input data object that corresponds to the conjunctive non-match field. For example, if a hashing input data object is associated with a first data field value admission_date=Jan. 29, 2021 and a second data field value insurance_provider_ID="1213", and if both the admission_date data field and the insurance_provider_ID are conjunctive non-match fields, then the segmentation-based hashing model 421 generates a hash representation of the first field value as a first conjunctive non-match field value hash representation and a hash representation of the second field value as a second conjunctive non-match field value hash representation. Importantly, in some embodiments, the segmentation-based hashing model 421 does not combine the C conjunctive non-match field value hash representations of C conjunctive non-match fields of a hashing input data object to generate a conjunctive non-match requirement hash representation for the hashing input data object.

In some embodiments, the segmentation-based hashing model 421 does not generate, for each conjunctive non-match field value of a hashing input data object, a conjunctive non-match field value hash representation that is a hash representation of the data field value of the hashing input data object that corresponds to the conjunctive non-match field. Instead, the output hash representation combination for the hashing input data object may describe, for each conjunctive non-match field of a hashing input data object, a non-hash representation of the data field value of the hashing input data object that is associated with the conjunctive non-match field. For example, if a hashing input data object is associated with a first data field value admission_date=Jan. 29, 2021 and a second data field value insurance_provider_ID="1213", and if both the admission_date data field and the insurance_provider_ID are conjunctive non-match fields, then the segmentation-based hashing model 421 generates an output hash representation combination for the hashing input data object that describes/comprises a non-hash representation of the first field value and a non-hash representation of the second field value.

As further depicted in FIG. 4, the process 400 continues when the segmentation model 422 identifies (e.g., receives) a segmentation schema 441 for the expected query structure 401 that describes how the A hash representations for A match field values defined by the expected query structure 401 may be iteratively combined to generate a final segment that includes all of the A hash representations.

For example, consider an exemplary scenario in which the set of A match field values are associated with a member_name field, a member_ID field, a service_ID field that may repeat across each of L service lines, and a provider_ID that may repeat across each L service lines. An exemplary hashing input data object that corresponds to this structure is a database query that requests retrieval of database entries that: (i) have the same member_name as "John Smith," (ii) have the same member_ID as 12345, and (iii) have the following set of two service lines (i.e., L=2) in any order: {(service_ID=1454, provider_ID=564), (service_ID=1351, provider_ID=744)}. In this example, the segmentation schema 441 may define the following segments: (i) a segment S1=[member_name, member_ID], which is an ordered list associated with the match fields member_name and member_ID, (ii) L segment S2s, where each segment $S2_i$=[$service\_ID_i$, $provider\_ID_i$] is an ordered list of the service_ID and the provider_ID for an ith service line of the L service lines, (iii) a segment S3={$S2_i$} for i=1 . . . L that is an unordered set of all S2 segments across the L service lines, and (iv) a final segment S4=[S1, S3] that is an ordered list of segment S1 and segment S3. In some embodiments, [ ] are used herein to denote ordered lists, while { } are used to denote unordered lists, as those terms are further described below.

As further depicted in FIG. 4, the process 400 continues when, after receiving the A match field value hash representations 431 from the segmentation-based hashing model 421, the segmentation model 422 generates a match requirement hash representation 442 for the hashing input data object 402 based at least in part on the A match field value hash representations 431 for the hashing input data object 402 and provides the match requirement hash representation 442 to the segmentation-based hashing model 421. To do so, the segmentation model performs, via N segmentation iterations, a sequence of M hash merger operations on each match field value hash representation of the A match field value hash representations 431 for the hashing input data object 402 to generate the match requirement hash representation 442 for the hashing input data object 402. After generating the match requirement hash representation 442, the segmentation model 422 provides the match requirement hash representation 442 to the segmentation-based hashing model 421.

The M hash merger operations described above may combine the A match field value hash representations 431 in accordance with the segmentation schema 441 to generate the match requirement hash representation 442. Each hash merger operation may be associated with a segment defined by the segmentation schema 441 and may require combining the hash representations associated with the elements of the corresponding segment in order to generate a resulting (i.e., merged hash representation) hash representation.

For example, consider the exemplary segmentation schema that defines the following segments: (i) a segment S1=[member_name, member_ID], which is an ordered list associated with the match fields member_name and member_ID, (ii) L segment S2s, where each segment $S2_i$= [service_$ID_i$, provider_$ID_i$] is an ordered list of the service_ID and the provider_ID for an ith service line of the L service lines, (iii) a segment S3={$S2_i$} for i=1 . . . L that is an unordered set of all S2 segments across the L service lines, and (iv) a final segment S4=[S1, S3] that is an ordered list of segment S1 and segment S3. In this example, the segment S1 may be associated with a first hash merger operation that is configured to perform an ordered list generation operation on the hash representation for the member_name field value for a hashing input data object and the hash representation for the member_ID value for a hashing input data object to generate a first resulting hash representation; the S2 segments may be associated with L second hash merger operations, where each second hash merger operation may be associated with an ith service line and be configured to perform an ordered list generation operation on the hash representation for the service_$ID_i$ value for the ith service line of the hashing input data object and the hash representation for the provider_$ID_i$ value for the ith service line to generate a segment a second resulting hash representation; the segment S3 may be associated with a third hash merger operation that is configured to perform an unordered set generation operation on the L second resulting hash representations generated by the L second hash merger operations to generate a third resulting hash representation, and the segment S4 may be associated with a fourth hash merger operation that is configured to perform an ordered list generation operation on the first resulting hash representation and the third resulting hash representation to generate a final merged hash representation that may be adopted as the match requirement hash representation 442 for the hashing input data object.

An operational example of performing six hash merger operations is depicted in FIG. 7. As depicted in FIG. 7, a set of 14 match field values 701 associated with a set of eight match fields (i.e., a Member ID match field, a Member Group match field, a Date of Service match field, a Provider ID match field, a Provider Tax ID match field, a Procedure match field, a Procedure Mod match field, and a Procedure Bill match field) are first hashed to generate a set of 14 match field value hash representations 702. These may be the set of A match field value hash representations 431 that the segmentation-based hashing model 421 generates and provides to the segmentation model 422.

In some embodiments, each hash representation of a field value (e.g., each match field value hash representation of a match field value, each disjunctive non-match field value hash representation of a disjunctive non-match field value, each conjunctive non-match field value hash representation of a conjunctive non-match field value, and/or the like) of a database entry has at least $$\log_2\left(\frac{N^2}{2p}\right)$$

bits, where N is the number of database entries in an underlying database and p is an acceptable false positive rate per database entry of the underlying database. For example, given 2 billion database entries associated with three years and an acceptable false positive rate per database entry of less than one database entry per week of the three-year period, at least 114 bits are needed for hashing.

As further depicted in FIG. 7, a first hash merger operation 711 combines a set of hash representations for the first seven match values as an ordered list in order to generate a first resulting merged hash representation. In other words, the first hash merger operation 711 performs a first ordered list generation operation on the hash representations for the first seven match values in order to generate the first resulting merged hash representation.

As further depicted in FIG. 7, the second hash merger operation 712 combines a set of hash representations for the match values that correspond to the first occurrence of the match fields Procedure, Procedure Mod, and Procedure Bill (e.g., the Procedure field value, the Procedure Mod field value, and the Procedure Bill field value of a first service line/claim line) to generate a second resulting merged hash representation. In other words, the second hash merger operation 712 performs a second ordered list generation operation on the match values that correspond to the first occurrence of the match fields Procedure, Procedure Mod, and Procedure Bill to generate to generate the second resulting merged hash representation.

As further depicted in FIG. 7, the third hash merger operation 713 combines a set of hash representations for the match values that correspond to the second occurrence of the match fields Procedure, Procedure Mod, and Procedure Bill (e.g., the Procedure field value, the Procedure Mod field value, and the Procedure Bill field value of a first service line/claim line) to generate a third resulting merged hash representation. In other words, the third hash merger operation 713 performs a third ordered list generation operation on the match values that correspond to the second occurrence of the match fields Procedure, Procedure Mod, and Procedure Bill to generate to generate the third resulting merged hash representation. In some embodiments, because the match fields Procedure, Procedure Mod, and Procedure Bill can have a variable number of occurrences across data field values of different hashing input data objects, given a particular hashing input data object having L occurrences of each noted match field, the hash representations for each ith occurrence of the three match fields across the hashing input data object is first combined as an ordered list, and then the L hash representations are combined as an unordered set.

As further depicted in FIG. 7, the fourth hash merger operation 714 combines a set of hash representations for the match values that correspond to the third occurrence of the match fields Procedure, Procedure Mod, and Procedure Bill (e.g., the Procedure field value, the Procedure Mod field value, and the Procedure Bill field value of a first service line/claim line) to generate a fourth resulting merged hash representation. In other words, the fourth hash merger operation 715 performs a fourth ordered list generation operation on the match values that correspond to the third occurrence of the match fields Procedure, Procedure Mod, and Procedure Bill to generate to generate the third resulting merged hash representation.

As further depicted in FIG. 7, the fifth hash merger operation 715 combines the second resulting merged hash representation, the third resulting merged hash representation, and the fourth resulting merged hash representation as an unordered set to generate a fifth resulting merged hash representation. In other words, the fifth hash merger operation 715 performs an unordered set generation operation on the second resulting merged hash representation, the third resulting merged hash representation, and the fourth resulting merged hash representation to generate the fifth resulting merged hash representation. In some embodiments, because the match fields Procedure, Procedure Mod, and Procedure Bill can have a variable number of occurrences across data field values of different hashing input data objects, given a particular hashing input data object having L occurrences of each noted match field, the hash representations for each ith occurrence of the three match fields across the hashing input data object is first combined as an ordered list, and then the L hash representations are combined as an unordered set.

As further depicted in FIG. 7, the sixth hash merger operation 716 combines the first resulting merged hash representation and the fifth resulting merged hash representation as an ordered list to generate a single final hash representation that is described by the merged hash representation set and is used to generate the match requirement hash representation. In other words, the sixth hash merger operation 716 performs a fifth ordered list generation operation on the first resulting merged hash representation and the fifth resulting merged hash representation to generate the final hash representation that is described by the merged hash representation set and is used to generate the match requirement hash representation.

Returning to FIG. 4, in some embodiments, the segmentation model 422 performs the M hash merger operations using N segmentation iterations, where the N segmentation iterations are configured to iteratively update a merged hash representation set until the merged hash representation set includes a single hash representation which is the match requirement hash representation 442. In some embodiments, performing the N segmentation iterations with respect to a hashing input data object can be performed in accordance with the process 800 that is depicted in FIG. 8. The process 800 begins at step/operation 801 when the segmentation model 422 receives a set of A match field value hash representations for a hashing input data object (e.g., the set of match field value hash representations 702 in FIG. 7).

Figure 14A:
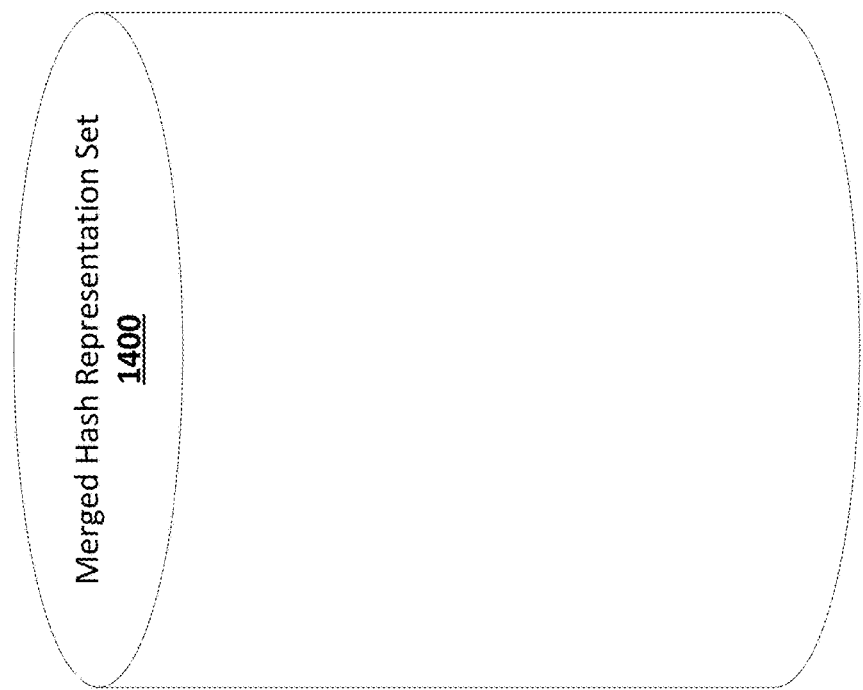

At step/operation 802, the segmentation model 422 initializes the merged hash representation set to be an empty set. For example, as depicted in FIG. 14A, the merged hash representation set 1400 initially is an empty set that has no merged hash representations.

Figure 14B:
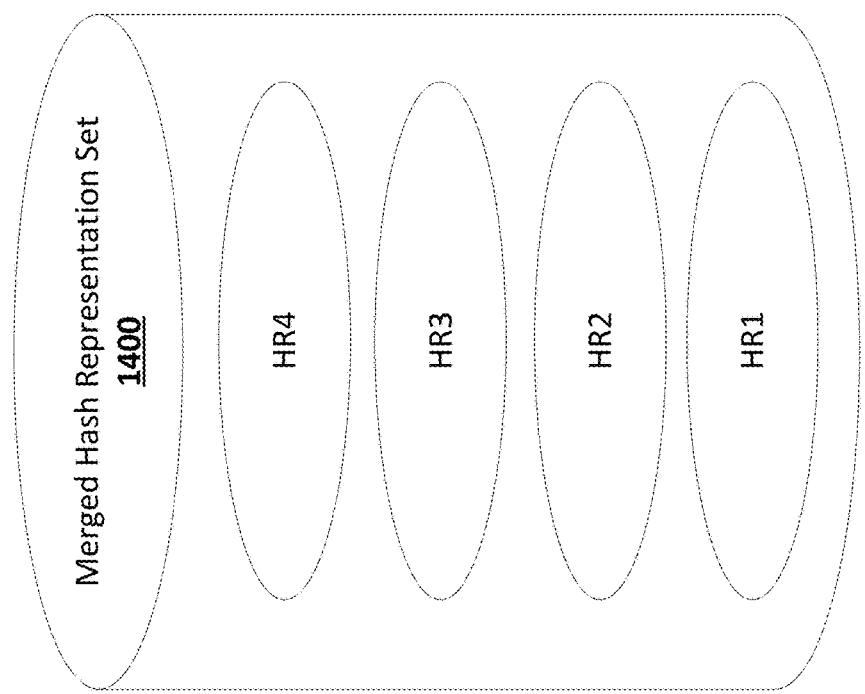

At step/operation 803, during an initial segmentation iteration, the segmentation model 422 performs K initial hash merger operations to generate a merged hash representation set comprising K initial merged hash representations, each initial merged hash representation being generated by combining match field value hash representations for a corresponding subset of the plurality of match fields. In the exemplary embodiment of FIG. 7 (where K=4), this includes performing initial hash merger operations 711-714. Each of these initial hash merger operations 711-714 comprises combining match field value hash representations for a subset of the set of match field values 701 associated with the match fields. Accordingly, after performing the step/operation 803, the merged hash representation includes all of the merged hash representations generated by performing the initial hash merger operations. For example, as depicted in FIG. 14B, the merged hash representation set 1400 includes: (i) a first resulting merged hash representation HR1 that may be generated based at least in part on the output of the following operations: hash(Member ID)+hash(Member Group)+hash(Date of Service)+hash(Provider ID)+hash(Provider Tax ID), (ii) a second resulting merged hash representation HR2 that may be generated based at least in part on the output of the following operations: hash(Procedure 1)+hash(Procedure Mod 1)+hash(Procedure Bill 1), (iii) a third resulting merged hash representation HR3 that may be generated based at least in part on the output of the following operations: hash(Procedure 2)+hash(Procedure Mod 2)+hash(Procedure Bill 2), and (iv) a fourth resulting merged hash representation HR4 that may be generated based at least in part on the output of the following operations: hash(Procedure 3)+hash(Procedure Mod 3)+hash(Procedure Bill 3).

At step/operation 804, during each non-initial segmentation iteration, the segmentation model 422 performs a corresponding non-initial hash merger operation to update the merged hash representation set by replacing a defined subset of the merged hash representation set with a resulting merged hash representation that is generated by combining the merged hash representations in the defined subset. Each non-initial hash merger operation thus in turn combines at least two merged representations in the merged hash representation set (i.e., after being initialized by the K hash merger operations of the initial segmentation iteration) to generate a resulting merged hash representation, then removes the at least two merged representations, and adds the resulting merged hash representation instead of the removed at least two merged representations.

Figure 14C:
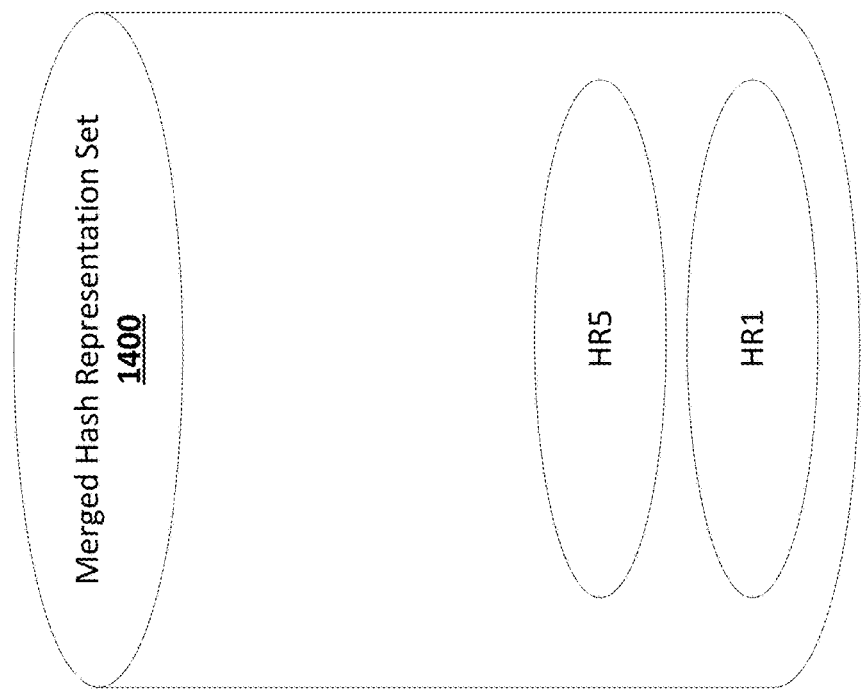
Figure 14D:
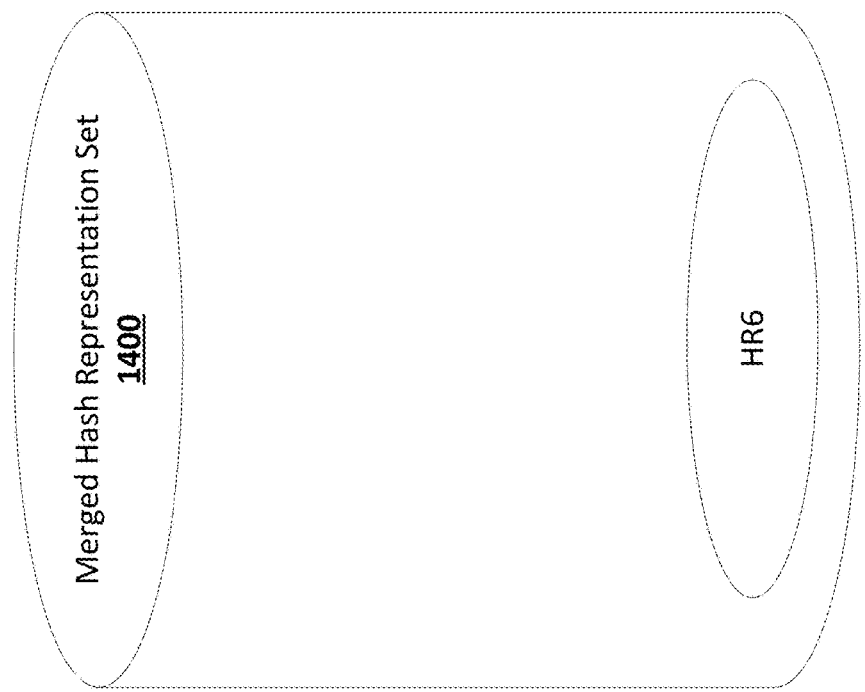

For example, a first non-initial segmentation iteration may perform/execute the fifth hash merger operation 715 of FIG. 7. Accordingly, as depicted in FIG. 14C, after performing a first non-initial segmentation iteration (i.e., a second segmentation iteration), the merged hash representation set 1400 is updated to replace HR2, HR3, and HR4 with an HR5, which is generated by combining HR2, HR3, and HR4 as an ordered set. In some embodiments, HR5 is generated based at least in part on the output of the following operations: HR2+2*HR3+3*HR4. As another example, a second non-initial segmentation iteration may perform/execute the fifth hash merger operation 716 of FIG. 7. Accordingly, as depicted in FIG. 14D, after performing a second non-initial segmentation iteration (e.g., a third segmentation iteration), the merged hash representation set 1400 is updated to replace HR1 and HR5 with HR6, which is generated by combining HR1 and HR5. In some embodiments, HR6 is generated based at least in part on the output of the following operations: HR1+HR5.

At step/operation 805, the segmentation model 422 determines the match requirement hash representation based at least in part on the sole resulting merged hash representation in the merged hash representation set that is remaining after performing/executing the final segmentation iteration. This is because, during a final segmentation iteration, the segmentation model performs a corresponding hash merger operation to update the merged hash representation set by replacing all of the merged hash representation set with the match requirement hash representation. Accordingly, after performing all of the segmentation iterations, the merged hash representation set includes a single resulting merged hash representation (e.g., the merged hash representation HR6 as depicted in FIG. 14D) that is the match requirement hash representation.

In some embodiments, a hash merger operation is either an unordered set generation operation or an ordered list generation operation. In some embodiments, an unordered set generation operation is a computer-implemented operation that combines hash representations for two or more field values (e.g., match field value hash representations for two or more match field values) into a single merged hash representation, where the combination does not reflect/describe any ordering of the hash representations and/or any ordering of the two or more field values. For example, in some embodiments, an unordered set generation operation on data field values A, B, and C is denoted as {A, B, C} and is performed using the operations of the equation hash(A)+hash(B)+hash(C), where + is an addition operation and hash(n) is the hash representation of a data field value n. In some embodiments, each unordered set generation operation is configured to: identify an unordered sequence of input hash representation; and generate the resulting merged hash representation based at least in part on (e.g., based at least in part on the output of addition of) each input hash representation in the unordered sequence.

In some embodiments, an ordered list generation operation is a computer-implemented operation that combines hash representations for two or more field values (e.g., match field value hash representations for two or more match field values) into a single merged hash representation, where the combination does reflects/describes an ordering of the hash representations and/or an ordering of the two or more field values. For example, in some embodiments, an ordered list generation operation on data field values A, B, and C is denoted as [A, B, C] and is performed using the operations of the equation hash(A)+2*hash(B)+3*hash(C), where + is an addition operation and hash(n) is the hash representation of a data field value n. In general, in some embodiments, given Y input hash representations, each input hash representation is first multiplied by a sequence number that describes the position of the corresponding data field in an ordering of data fields (e.g., by mapping the position to a corresponding value in a non-repeating sequence) to generate an order-aware hash representation, and then the Y order-aware hash representations are combined (e.g., summed up) to generate the merged hash representation. In some embodiments, an ordered list generation operation is configured to: identify an ordered sequence of input hash representations each associated with a sequence number; for each input hash representation, generating an order-aware hash representation based at least in part on the input hash representation and the sequence number for the input hash representation; and generate the resulting merged hash representation based at least in part on each order-aware hash representation.

Returning to FIG. 4, after receiving the match requirement hash representation 442 from the segmentation model 422, the segmentation-based hashing model 421 generates the output hash representation combination 411 based at least in part on the match requirement hash representation 442. As described above, in some embodiments, the output hash representation combination 411 describes the match requirement hash representation 442 and the set of B disjunctive non-match hash representations 432. In some embodiments, the output hash representation combination 411 is a combination of the match requirement hash representation 442, the set of B disjunctive non-match hash representations 432, and the set of C conjunctive non-match has representations 433. In some embodiments, the output hash representation combination 411 is a combination of the match requirement hash representation 442, the set of B disjunctive non-match hash representations 432, and non-hash representations of the conjunctive non-match field values associated with the C conjunctive non-match fields of the hashing input data object 402.

Exemplary Database Generation Operations

As described above, once generated, an output hash representation combination 411 of a hashing input data object 402 may be used to generate database entries of a query-compliant hash database 111. In some embodiments, generating the query-compliant hash database 111 may be performed in accordance with the process 900 that is depicted in FIG. 9. The process 900 begins at step/operation 901 when the database management computing entity 106 identifies an underlying database having a set of D underlying database entries.

At step/operation 902, the database management computing entity 106 executes operations of the segmentation-based hashing model 421 D times to generate D output hash representation combinations for the D underlying database entries. During each execution, the segmentation-based hashing model 421 processes a hashing input data object 402 that comprises the data field values of a corresponding underlying database entry to generate an output hash representation combination 411 for the underlying database entry. Accordingly, after the D executions of the segmentation-based hashing model 421, D output hash representation combinations are generated, each output hash representation combination being associated with an underlying database entry and comprising hash representations associated with the underlying database. In some embodiments, the output hash representation combination for a database entry includes a match requirement hash representation determined based at least in part on field values for match fields of the database entry, a disjunctive non-match requirement hash representation for each disjunctive non-match requirement of the database entry that is determined based at least in part on disjunctive non-match field values for the disjunctive non-match fields of the database entry that are associated with the noted disjunctive non-match requirement, and a conjunctive non-match requirement hash representation for each conjunctive non-match field value associated with a conjunctive non-match field of the database entry. In some embodiments, the output hash representation combination for a database entry includes a match requirement hash representation determined based at least in part on match field values for match fields of the database entry, a disjunctive non-match requirement hash representation for each disjunctive non-match requirement of the database entry that is determined based at least in part on disjunctive non-match field values for the disjunctive non-match fields of the database entry that are associated with the noted disjunctive non-match requirement, and a non-hash representation of each conjunctive non-match value associated with a conjunctive non-match field of the database entry.

For example, consider an underlying database entry of an underlying database that is associated with the following field values: a field value V1 for a field F1, a field value V2 for a field F2, a field value V3 for a field F3, a field value V4 for a field F4, a field value V5 for a field F5, and a field value V6 for a field F6. If expected queries associated with the underlying database requires retrieval of those database entries that: (i) have matching field values relative to the field values specified in the queries for the fields F1 and F2, (ii) have non-matching field values relative to the field values specified in the queries for at least one of the fields F3 and F4, and (iii) have a non-match field values relative to the field values specified in the queries for the fields F5 and F6, then the output hash representation combination for the underlying database entry may include: (i) a match requirement hash representation that is determined based at least in part on a merger of the match field value hash representation for V1 and the match field value hash representation for V2, (ii) a disjunctive non-match requirement hash representation that is determined based at least in part on a merger of the disjunctive non-match field value hash representation for V3 and the disjunctive non-match field value hash representation for V4, (iii) a conjunctive non-match field value hash representation for V5, and (iv) a conjunctive non-match field value hash representation for V6.

As another example, consider an underlying database entry of an underlying database that is associated with the following field values: a field value V1 for a field F1, a field value V2 for a field F2, a field value V3 for a field F3, a field value V4 for a field F4, a field value V5 for a field F5, and a field value V6 for a field F6. If expected queries associated with the underlying database requires retrieval of those database entries that: (i) have matching field values relative to the field values specified in the queries for the fields F1 and F2, (ii) have non-matching field values relative to the field values specified in the queries for at least one of the fields F3 and F4, and (iii) have a non-match field values relative to the field values specified in the queries for the fields F5 and F6, then the output hash representation combination for the underlying database entry may include: (i) a match requirement hash representation that is determined based at least in part on a merger of the match field value hash representation for V1 and the match field value hash representation for V2, (ii) a disjunctive non-match requirement hash representation that is determined based at least in part on a merger of the disjunctive non-match field value hash representation for V3 and the disjunctive non-match field value hash representation for V4, (iii) a non-hash representation for V5, and (iv) a non-hash representation for V6.

At step/operation 903, the database management computing entity 106 stores the D output hash representation combinations for the D underlying database entries on a storage medium (e.g., using a relational database management system) to generate the query-compliant hash database 111. The query-compliant hash database 111 may thus be a hash representation of an underlying database that is hashed in accordance with the expected query structure for an expected query (e.g., a common query) of the underlying database.

In some embodiments, given an underlying database that is associated with E expected query structures, where each ith expected query structures of the E expected query structure is associated with $F_i$ disjunctive non-match requirements and $G_i$ conjunctive non-match fields, the query-compliant hash database 111 includes $$\sum_{i=1}^{E}(F_i + G_i + 1)$$

hash representations, including, for each of the E expected query structures: (i) a number of disjunctive non-match requirement hash representations equal to the number of disjunctive non-match requirements of the expected query structure, (ii) a number of conjunctive non-match field value hash representations equal to the number of conjunctive non-match fields of the expected query structure, and (iii) a match requirement hash representation for the match requirement of the expected query. From a storage-wise standpoint, this is much more resource efficient than storing the values of the database entries of the underlying database. This is because: (i) hash representations are smaller (i.e., can be stored using a lower number of bits) than non-hash representations, and (ii) hash representations for various data field values can be combined to generate match requirement hash representations and disjunctive non-match requirement hash representations, thus avoiding the need for separate storage of data pertaining to match field values and disjunctive non-match field values of a disjunctive non-match requirement.

For example, consider an exemplary underlying database that is associated with the expected query structure that requires a match across fields F1 and F2, a disjunctive non-match across fields F3 and F4, and a non-match across field F5. Without using the query-compliant hashing techniques described herein, storing each database entry will have a storage requirement of O(H*5), where H is the average storage cost of an underlying database field value. However, using at least some of the query-compliant hashing techniques described herein, a database entry will be stored as a combination of three hash representations: a match requirement hash representation, a disjunctive non-match requirement hash representation, and a conjunctive non-match field value hash representation. Thus, using at least some of the query-compliant hashing techniques described herein, storing each database entry will have a storage requirement of O(J*3), where J is the average storage cost of a hash representation (which is typically less than H).

In some embodiments, given an underlying database that is associated with E expected query structures, where each ith expected query structures of the E expected query structure is associated with $F_i$ disjunctive non-match requirements and $G_i$ conjunctive non-match fields, the query-compliant hash database 111 includes $$\sum_{i=1}^{E}(F_i + G_i + 1)$$

values, including, for each of the E expected query structures: (i) a number of disjunctive non-match requirement hash representations equal to the number of disjunctive non-match requirements of the expected query structure, (ii) a number of non-hash representations equal to the number of conjunctive non-match fields of the expected query structure, and (iii) a match requirement hash representation for the match requirement of the expected query. From a storage-wise standpoint, this is much more resource efficient than storing the values of the database entries of the underlying database. This is because: (i) hash representations are smaller (i.e., can be stored using a lower number of bits) than non-hash representations, and (ii) hash representations for various data field values can be combined to generate match requirement hash representations and disjunctive non-match requirement hash representations, thus avoiding the need for separate storage of data pertaining to match field values and disjunctive non-match field values of a disjunctive non-match requirement.

For example, consider an exemplary underlying database that is associated with the expected query structure that requires a match across fields F1 and F2, a disjunctive non-match across fields F3 and F4, and a non-match across field F5. Without using the query-compliant hashing techniques described herein, storing each database entry will have a storage requirement of O(H*5), where H is the average storage cost of an underlying database field value. However, using at least some of the query-compliant hashing techniques described herein, a database entry will be stored as a combination of three values: a match requirement hash representation, a disjunctive non-match requirement hash representation, and a non-hash representation of the conjunctive non-match field value for F5. Thus, using at least some of the query-compliant hashing techniques described herein, storing each database entry will have a storage requirement of O(J*2+H), where J is the average storage cost of a hash representation (which is typically less than H), and H is the average storage cost of a non-hash representation.

Exemplary Query Processing Operations

As described above, once generated, an output hash representation combination 411 of a hashing input data object 402 may be used to query database entries of a query-compliant hash database 111. In some embodiments, querying a query-compliant hash database 111 may be performed in accordance with the process 1000 that is depicted in FIG. 10. The process 1000 begins at step/operation 1001 when the database management computing entity 106 identifies query field values of a database query for an underlying database (e.g., as described by a database query data object for the database query). The query field values may describe a set of match field values subject to a match requirement, a set of disjunctive non-match fields subject to a disjunctive non-match requirement, and a set of conjunctive non-match fields subject to a conjunctive non-match requirement.

For example, consider a database query that requires retrieval of each underlying database entry that has a field value V1 for a field F1 and a field value V2 for a field F2, where the field value for a field F3 is not V3 and a field value for a field F4 is not V4, and where at least one of the following is satisfied: (i) the field value for a field F5 is not V5, or (ii) the field value for a field F6 is not V6. In this example, V1 and V2 are match field values, V3 and V4 are conjunctive non-match field values, and V5 and V6 are disjunctive non-match field values.

At step/operation 1002, the database management computing entity 106 executes operations of the segmentation-based hashing model 421 on a hashing input data object comprising the query field values to generate an output hash representation combination for the database query. In some embodiments, the output hash representation combination describes a match requirement hash representation that is determined based at least in part on match field value hash representations for match field values of the database query, a set of disjunctive non-match requirement hash representations that is each associated with a disjunctive non-match requirement and is determined based at least in part on disjunctive non-match field value hash representations for disjunctive non-match field values of the database query that are associated with the corresponding disjunctive non-match requirement, and a set of conjunctive non-match field value hash representations that is each the hash representation of a conjunctive non-match field value. For example, given a database query that requires retrieval of each underlying database entry that has a field value V1 for a field F1 and a field value V2 for a field F2, where the field value for a field F3 is not V3 and a field value for a field F4 is not V4, and where at least one of the following is satisfied: (i) the field value for a field F5 is not V5, or (ii) the field value for a field F6 is not V6, the output hash representation combination for the database query may describe a match requirement hash representation that is determined based at least in part on hash representations of V1 and V2, a disjunctive non-match requirement hash representation that is determined based at least in part on hash representations of V5 and V6, a hash representation of V3, and a hash representation of V4.

In some embodiments, the output hash representation combination describes a match requirement hash representation that is determined based at least in part on match field value hash representations for match field values of the database query, a set of disjunctive non-match requirement hash representations that is each associated with a disjunctive non-match requirement and is determined based at least in part on disjunctive non-match field value hash representations for disjunctive non-match field values of the database query that are associated with the corresponding disjunctive non-match requirement, and a set of non-hash representations including the non-hash representation of each conjunctive non-match field value. For example, given a database query that requires retrieval of each underlying database entry that has a field value V1 for a field F1 and a field value V2 for a field F2, where the field value for a field F3 is not V3 and a field value for a field F4 is not V4, and where at least one of the following is satisfied: (i) the field value for a field F5 is not V5, or (ii) the field value for a field F6 is not V6, the output hash representation combination for the database query may describe a match requirement hash representation that is determined based at least in part on hash representations of V1 and V2, a disjunctive non-match requirement hash representation that is determined based at least in part on hash representations of V5 and V6, a non-hash representation of V3, and a non-hash representation of V4.

At step/operation 1003, the database management computing entity 106 generates a refined database query for the database query based at least in part on the output hash representation combination of the database query as generated at step/operation 1002. In some embodiments, when the output hash representation combination describes hash representations of conjunctive non-match field values of the database query, the refined database query is a database query that requires retrieval of a database entry of the underlying database where: (i) the match requirement hash representation of the database entry matches (i.e., is identical to) the match requirement hash representation of the database query, (ii) none of the one or more disjunctive non-match requirement hash representations of the database entry matches the corresponding one or more disjunctive non-match requirement hash representations of the database query, and (iii) none of the one or more conjunctive non-match field value hash representations of the database entry matches the corresponding one or more conjunctive non-match requirement hash representation of the database query. For example, consider a database query that is associated with match requirement hash representation t1, two conjunctive non-match field values that are associated with conjunctive non-match field value hash representations t2 and t3 respectively, and a disjunctive non-match requirement hash representation t4. In some embodiments, the refined database query for the noted database query has the form that is depicted in FIG. 11.

In some embodiments, when the output hash representation combination describes non-hash representations of conjunctive non-match field values of the database query, the refined database query is a database query that requires retrieval of a database entry of the underlying database where: (i) the match requirement hash representation of the database entry matches (i.e., is identical to) the match requirement hash representation of the database query, (ii) none of the one or more disjunctive non-match requirement hash representations of the database entry matches the corresponding one or more disjunctive non-match requirement hash representations of the database query, and (iii) none of the one or more conjunctive non-match field values matches the corresponding one or more conjunctive non-match field values of the database query. For example, consider a database query that is associated with match requirement hash representation t1, two conjunctive non-match field values W and X, and a disjunctive non-match requirement hash representation t4. In some embodiments, the refined database query for the noted database query has the form that is depicted in FIG. 12.

At step/operation 1004, the database management computing entity 106 performs one or more query retrieval operations corresponding to the refined query database and in relation to the query-compliant hash database in order to generate one or more refined query results. In some embodiments, performing query retrieval operations involves including data describing each database entry that corresponds to the refined query database among the refined query results.

In some embodiments, given a refined database query that is associated with O match field values, P disjunctive non-match field values associated with Q disjunctive non-match requirements, and R conjunctive non-match field values, using at least some of the query-compliant hashing techniques described herein, executing the refined database query has a computational complexity of O(Q+R). However, without using at least some of the query-compliant hashing techniques described herein, executing a non-refined database query corresponding to the refined database query has a computational complexity O(O+P+R), where O+P+R is by definition larger than Q+R as Q<P and P>=0. Accordingly, using at least some of the query-compliant hashing techniques described herein reduces the computational complexity of executing operations corresponding to database queries, and thus reduces the computational efficiency of performing database retrieval operations.

At step/operation 1005, the database management computing entity 106 performs one or more database management operations based at least in part on the one or more refined query results. Examples of database management operations include: (i) storing permanent and/or temporarily relational database tables that include data determined based at least in part on the one or more refined query results (e.g., data determined based at least in part on the output of one or more join operations performed based at least in part on the refined query results), (ii) storing data determined based at least in part on the one or more refined query results (e.g., data determined based at least in part on the output of one or more join operations performed based at least in part on the refined query results) as one or more index files for the query-compliant hash database, (iii) setting one or more operational parameters of the query-compliant hash database based at least in part on the one or more refined query results (e.g., data determined based at least in part on the output of one or more join operations performed based at least in part on the refined query results), (iv) storing data determined based at least in part on the one or more refined query results (e.g., data determined based at least in part on the output of one or more join operations performed based at least in part on the refined query results) as one or more files stored using memoization techniques (e.g., one or more files stored using memoization techniques on one or more cache storage mediums), and (iv) determining one or more new expected query structure for an underlying database associated with the query-compliant hash database based at least in part on the one or more refined query results (e.g., data determined based at least in part on the output of one or more join operations performed based at least in part on the refined query results).

Other examples of database management operations that can be performed based at least in part on the one or more refined query results include generating user interface for a query output user interface that describes the refined query results. An example of such a query output user interface 1300 is depicted in FIG. 13. The query output user interface 1300 include query output data generated based at least in part on the output of a refined database query generated using at least some of the query-compliant hashing techniques described herein.

As described above, various embodiments of the present invention make important technical contributions to improving storage efficiency (i.e., the amount of storage resources needed to store data associated with) a database system by storing an underlying database as a query-compliant hash database that is generated based at least in part on expected query structures for expected queries (e.g., common queries, queries that are determined to be regular occurring based at least in part on query frequency data associated with the database systems, and/or the like) of the underlying database. In some embodiments, given an underlying database that is associated with E expected query structures, where each ith expected query structures of the E expected query structure is associated with $F_i$ disjunctive non-match requirements and $G_i$ conjunctive non-match fields, the query-compliant hash database includes $$\sum_{i=1}^{E}(F_i + G_i + 1)$$

hash representations, including, for each of the E expected query structures: (i) a number of disjunctive non-match requirement hash representations equal to the number of disjunctive non-match requirements of the expected query structure, (ii) a number of conjunctive non-match field value hash representations equal to the number of conjunctive non-match fields of the expected query structure, and (iii) a match requirement hash representation for the match requirement of the expected query. From a storage-wise standpoint, this is much more resource efficient than storing the values of the database entries of the underlying database. This is because: (i) hash representations are smaller (i.e., can be stored using a lower number of bits) than non-hash representations, and (ii) hash representations for various data field values can be combined to generate match requirement hash representations and disjunctive non-match requirement hash representations, thus avoiding the need for separate storage of data pertaining to match field values and disjunctive non-match field values of a disjunctive non-match requirement.

Furthermore, as further described above, various embodiments of the present invention make important technical contributions to improving computational efficiency of (i.e., reducing the amount of computational resources needed to perform) database query/retrieval operations. In some embodiments, given a refined database query that is associated with O match field values, P disjunctive non-match field values associated with Q disjunctive non-match requirements, and R conjunctive non-match field values, using at least some of the query-compliant hashing techniques described herein, executing the refined database query has a computational complexity of O(Q+R). However, without using at least some of the query-compliant hashing techniques described herein, executing a non-refined database query corresponding to the refined database query has a computational complexity O(O+P+R), where O+P+R is by definition larger than Q+R as Q<P and P>=0. According, using at least some of the query-compliant hashing techniques described herein reduces the computational complexity of executing operations corresponding to database queries, and thus reduces the computational efficiency of performing database retrieval operations.

Moreover, as described above, using at least some of the query-compliant hashing techniques described herein, given a list of O match field values, where O>1, performing database query/retrieval operations by matching across the O match field values would require one matching operation, and thus have a constant computational complexity. However, without using at least some of the query-compliant hashing techniques described herein, performing database query/retrieval operations by matching across the O match field values would require O! matching operations (e.g., because of the operations associated with explicit coding and checking in Structured Query Language (SQL) like frameworks), and would have the non-constant computational complexity of O(O!). In this way, various embodiments of the present invention make additional important technical contributions to improving computational efficiency of (i.e., reducing the amount of computational resources needed to perform) database query/retrieval operations. Moreover, by describing techniques for storing one hashed representation for O match field values, instead of O hashed or non-hashed representations for O match field values, various embodiments of the present invention describe techniques for reducing storage requirements of (i.e., the amount of storage resources needed for storing data associated with) database systems.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although, specific terms are employed herein, they are used in a generic and descriptive sense only and not for purposes of limitation.

The invention claimed is:

1. A computer-implemented method for performing one or more database management operations in relation to a query-compliant hash database, the computer-implemented method comprising:
   identifying, using one or more processors, a segmentation-based hashing model, wherein the segmentation-based hashing model is configured to:
   for each match field value of a plurality of match field values of a hashing input data object that are subject to a match requirement, generate each match field value hash representation,
   combine each match field value hash representations using a segmentation model associated with the segmentation-based hashing model to generate a match requirement hash representation for the match requirement,
   for each disjunctive non-match field value of disjunctive non-match field values of the hashing input data object that are subject to a disjunctive non-match requirement, generate each disjunctive non-match field value hash representation,
   determine a disjunctive non-match requirement hash representation for the disjunctive non-match requirement based at least in part on said each disjunctive non-match field value hash representation, and generate an output hash representation combination for the hashing input data object based at least in part on the match requirement hash representation and the disjunctive non-match requirement hash representation;
   generating, using the one or more processors and the segmentation-based hashing model and based at least in part on a plurality of query field values of a database query received from a client via a network interface, a query hash representation combination for the segmentation-based hashing model, wherein the query hash representation combination is the output hash representation combination generated by the segmentation-based hashing model via processing the database query as the hashing input data object;
   generating, using the one or more processors and based at least in part on the query hash representation combination, a refined database query corresponding for the database query;
   performing, using the one or more processors, one or more query retrieval operations corresponding to the refined database query and in relation to the query-compliant hash database in order to generate one or more refined query results; and
   performing, using the one or more processors, the one or more database management operations based at least in part on the one or more refined query results.

2. The computer-implemented method of claim 1, wherein the segmentation-based hashing model is further configured to: for each conjunctive non-match field value of one or more conjunctive non-match field values of the hashing input data object that are subject to a conjunctive non-match requirement, generate a conjunctive non-match field value hash representation, and generate the output hash representation combination for the hashing input data object based at least in part on the match requirement hash representation, each disjunctive non-match field value hash representation, and each conjunctive non-match field value hash representation.

3. The computer-implemented method of claim 1, wherein the segmentation-based hashing model is further configured to: generate the output hash representation combination for the hashing input data object based at least in part on the match requirement hash representation, each disjunctive non-match field value hash representation, and each non-hash representation for one or more conjunctive non-match field values of the hashing input data object that are subject to a conjunctive non-match requirement.

4. The computer-implemented method of claim 1, wherein: the segmentation model is configured to perform, via segmentation iterations, a sequence of hash merger operations on each match field value hash representation for the hashing input data object to generate the match requirement hash representation for the hashing input data object;
during an initial segmentation iteration, the segmentation model performs initial hash merger operations to generate a merged hash representation set comprising initial merged hash representations, each initial merged hash representation being generated by combining match field value hash representations for a corresponding subset of data field value values associated with the plurality of match field values;
during each non-initial segmentation iteration, the segmentation model performs a corresponding non-initial hash merger operation to update the merged hash representation set by replacing a defined subset of the merged hash representation set with a resulting merged hash representation; and
during a final segmentation iteration, the segmentation model performs a corresponding hash merger operation to update the merged hash representation set by replacing the merged hash representation set with the match requirement hash representation.

5. The computer-implemented method of claim 4, wherein the hash merger operations comprise one or more ordered list generation operations and one or more unordered set generation operations.

6. The computer-implemented method of claim 5, wherein each ordered list generation operation is configured to:
identify an ordered sequence of input hash representations, each input hash representation associated with a sequence number;
for each input hash representation, generating an order-aware hash representation based at least in part on a input hash representation and the sequence number for each input hash representation; and
generate a resulting merged hash representation based at least in part on each order-aware hash representation.

7. The computer-implemented method of claim 6, wherein each unordered set generation operation is configured to:
identify an unordered sequence of input hash representation; and
generate the resulting merged hash representation based at least in part on each input hash representation.

8. The computer-implemented method of claim 1, wherein each database entry of the query-compliant hash database is generated by hashing a database entry data object in accordance with the segmentation-based hashing model.

9. An apparatus for performing one or more database management operations in relation to a query-compliant hash database, the apparatus comprising at least one processor and at least one memory including program code, the at least one memory and the program code configured to, with the processor, cause the apparatus to at least:
identify a segmentation-based hashing model, wherein the segmentation-based hashing model is configured to:
for each match field value of a plurality of match field values of a hashing input data object that are subject to a match requirement, generate each match field value hash representation,
combine each match field value hash representation using a segmentation model associated with the segmentation-based hashing model to generate a match requirement hash representation for the match requirement,
for each disjunctive non-match field value of disjunctive non-match field values of the hashing input data object that are subject to a disjunctive non-match requirement, generate each disjunctive non-match field value hash representation,
determine a disjunctive non-match requirement hash representation for the disjunctive non-match requirement based at least in part on said each disjunctive non-match field value hash representation, and generate an output hash representation combination for the hashing input data object based at least in part on the match requirement hash representation and the disjunctive non-match requirement hash representation;
generate, using the segmentation-based hashing model and based at least in part on a plurality of query field values of a database query received from a client via network interface, a query hash representation combination for the segmentation-based hashing model, wherein the query hash representation combination is the output hash representation combination generated by the segmentation-based hashing model via processing the database query as the hashing input data object;
generate, based at least in part on the query hash representation combination, a refined database query corresponding for the database query;
perform one or more query retrieval operations corresponding to the refined database query and in relation to the query-compliant hash database in order to generate one or more refined query results; and
perform the one or more database management operations based at least in part on the one or more refined query results.

10. The apparatus of claim 9, wherein the segmentation-based hashing model is further configured to:
for each conjunctive non-match field value of one or more conjunctive non-match field values of the hashing input data object that are subject to a conjunctive non-match requirement, generate a conjunctive non-match field value hash representation, and
generate the output hash representation combination for the hashing input data object based at least in part on the match requirement hash representation, each disjunctive non-match field value hash representation, and each conjunctive non-match field value hash representation.

11. The apparatus of claim 9, wherein the segmentation-based hashing model is further configured to:
generate the output hash representation combination for the hashing input data object based at least in part on the match requirement hash representation, each disjunctive non-match field value hash representation, and each non-hash representation for one or more conjunctive non-match field values of the hashing input data object that are subject to a conjunctive non-match requirement.

12. The apparatus of claim 9, wherein: the segmentation model is configured to perform, via segmentation iterations, a sequence of hash merger operations on each match field value hash representation for the hashing input data object to generate the match requirement hash representation for the hashing input data object;

during an initial segmentation iteration, the segmentation model performs initial hash merger operations to generate a merged hash representation set comprising initial merged hash representations, each initial merged hash representation being generated by combining match field value hash representations for a corresponding subset of data field value values associated with the plurality of match field values;

during each non-initial segmentation iteration, the segmentation model performs a corresponding non-initial hash merger operation to update the merged hash representation set by replacing a defined subset of the merged hash representation set with a resulting merged hash representation; and during a final segmentation iteration, the segmentation model performs a corresponding hash merger operation to update the merged hash representation set by replacing all of the merged hash representation set with the match requirement hash representation.

13. The apparatus of claim 12, wherein the hash merger operations comprise one or more ordered list generation operations and one or more unordered set generation operations.

14. The apparatus of claim 13, wherein each ordered list generation operation is configured to:
identify an ordered sequence of input hash representations, wherein each input hash representation is associated with a sequence number;
for each input hash representation, generating an order-aware hash representation based at least in part on the input hash representation and the sequence number for the input hash representation; and
generate the resulting merged hash representation based at least in part on each order-aware hash representation.

15. The apparatus of claim 13, wherein each unordered set generation operation is configured to: identify an unordered sequence of input hash representation; and generate the resulting merged hash representation based at least in part on each input hash representation.

16. The apparatus of claim 9, wherein each database entry of the query-compliant hash database is generated by hashing a database entry data object in accordance with the segmentation-based hashing model.

17. A computer program product for performing one or more database management operations in relation to a query-compliant hash database, the computer program product comprising at least one non-transitory computer-readable storage medium having computer-readable program code portions stored therein, the computer-readable program code portions configured to:
identify a segmentation-based hashing model, wherein the segmentation-based hashing model is configured to:
for each match field value of a plurality of match field values of a hashing input data object that are subject to a match requirement, generate each match field value hash representation,
combine each match field value hash representations using a segmentation model associated with the segmentation-based hashing model to generate a match requirement hash representation for the match requirement,
for each disjunctive non-match field value of disjunctive non-match field values of the hashing input data object that are subject to a disjunctive non-match requirement, generate each disjunctive non-match field value hash representation,
determine a disjunctive non-match requirement hash representation for the disjunctive non-match requirement based at least in part on said each disjunctive non-match field value hash representation, and generate an output hash representation combination for the hashing input data object based at least in part on the match requirement hash representation and the disjunctive non-match requirement hash representation;
generate, using the segmentation-based hashing model and based at least in part on a plurality of query field values of a database query received from a client via network interface, a query hash representation combination for the segmentation-based hashing model, wherein the query hash representation combination is the output hash representation combination generated by the segmentation-based hashing model via processing the database query as the hashing input data object;
generate, based at least in part on the query hash representation combination, a refined database query corresponding for the database query;
perform one or more query retrieval operations corresponding to the refined database query and in relation to the query-compliant hash database in order to generate one or more refined query results; and
perform the one or more database management operations based at least in part on the one or more refined query results.

18. The computer program product of claim 17, wherein the segmentation-based hashing model is further configured to:
for each conjunctive non-match field value of one or more conjunctive non-match field values of the hashing input data object that are subject to a conjunctive non-match requirement, generate a conjunctive non-match field value hash representation, and
generate the output hash representation combination for the hashing input data object based at least in part on the match requirement hash representation, each disjunctive non-match field value hash representation, and each conjunctive non-match field value hash representation.

19. The computer program product of claim 17, wherein the segmentation-based hashing model is further configured to:
generate the output hash representation combination for the hashing input data object based at least in part on the match requirement hash representation, each disjunctive non-match field value hash representation, and each non-hash representation for one or more conjunctive non-match field values of the hashing input data object that are subject to a conjunctive non-match requirement.

20. The computer program product of claim 18, wherein: the segmentation model is configured to perform, via segmentation iterations, a sequence of hash merger operations on each match field value hash representation for the hashing input data object to generate the match requirement hash representation for the hashing input data object;
during an initial segmentation iteration, the segmentation model performs initial hash merger operations to generate a merged hash representation set comprising initial merged hash representations, each initial merged hash representation being generated by combining match field value hash representations for a corresponding subset of data field value values associated with the plurality of match field values;

during each non-initial segmentation iteration, the segmentation model performs a corresponding non-initial hash merger operation to update the merged hash representation set by replacing a defined subset of the merged hash representation set with a resulting merged hash representation; and during a final segmentation iteration, the segmentation model performs a corresponding hash merger operation to update the merged hash representation set by replacing all of the merged hash representation set with the match requirement hash representation.

\* \* \* \* \*

UNITED STATES PATENT AND TRADEMARK OFFICE
CERTIFICATE OF CORRECTION

| | |
|---|---|
| PATENT NO. | : 11,741,103 B1 |
| APPLICATION NO. | : 17/654694 |
| DATED | : August 29, 2023 |
| INVENTOR(S) | : Lorcan B. Mac Manus et al. |

It is certified that error appears in the above-identified patent and that said Letters Patent is hereby corrected as shown below:

On the Title Page

In Column 1, Item (12), United States Patent, Line 1, delete "MacManus" and insert -- Mac Manus --, therefor.

In Column 1, Item (72), Inventors, Line 1, delete "MacManus" and insert -- Mac Manus --, therefor.

Signed and Sealed this
Fourteenth Day of November, 2023

Katherine Kelly Vidal
*Director of the United States Patent and Trademark Office*